US010574388B2

(12) United States Patent
Lee et al.

(10) Patent No.: US 10,574,388 B2
(45) Date of Patent: Feb. 25, 2020

(54) TECHNIQUES FOR HANDLING OVERLAPPING SETS OF DOWNLINK CONTROL CHANNEL RESOURCES

(71) Applicant: QUALCOMM Incorporated, San Diego, CA (US)

(72) Inventors: Heechoon Lee, San Diego, CA (US); Peter Gaal, San Diego, CA (US); Jing Sun, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/943,533

(22) Filed: Apr. 2, 2018

(65) Prior Publication Data
US 2018/0287734 A1 Oct. 4, 2018

Related U.S. Application Data

(60) Provisional application No. 62/480,995, filed on Apr. 3, 2017.

(51) Int. Cl.
H04L 1/00 (2006.01)
H04L 5/00 (2006.01)
H04W 72/04 (2009.01)

(52) U.S. Cl.
CPC .......... H04L 1/0013 (2013.01); H04L 1/0045 (2013.01); H04L 1/0067 (2013.01); H04L 5/0048 (2013.01); H04L 5/0053 (2013.01); H04L 5/0073 (2013.01); H04L 5/0023 (2013.01); H04W 72/042 (2013.01); H04W 72/0446 (2013.01)

(58) Field of Classification Search
CPC .......... H04L 2012/5608; H04W 84/12; H04W 88/08; H04W 88/04; H04W 88/06; H04W 80/04; H04W 84/18; H04W 74/08; H04W 72/04; H04W 76/00; H04W 36/30; H04W 36/24; H04W 84/08; H04W 76/02; H04W 74/0816; H04W 74/04; H04W 72/0406; H04B 7/2123; H04B 7/212
USPC ...... 370/310.2, 328, 338, 322, 329, 332, 341
See application file for complete search history.

(56) References Cited

U.S. PATENT DOCUMENTS

2013/0250874 A1    9/2013  Luo et al.
2016/0043849 A1*   2/2016  Lee ................... H04W 72/042
                                                    370/329
2019/0116592 A1*   4/2019  Moon ............... H04W 72/0453

OTHER PUBLICATIONS

International Search Report and Written Opinion—PCT/US2018/025958—ISA/EPO—dated Jun. 15, 2018.

* cited by examiner

Primary Examiner — Brenda H Pham
(74) Attorney, Agent, or Firm — Holland & Hart LLP

(57) ABSTRACT

Techniques for monitoring for control information in sets of downlink control channel resources are described, where multiple sets of downlink control channel resources may overlap. The described techniques include monitoring for one or more search spaces in a set of downlink control channel resources by rate matching downlink control channel resources independently of other sets of downlink control channel resources. Alternatively, overlapping sets of downlink control channel resources may be rate-matched accounting for reference signals of overlapping sets of downlink control channel resources.

24 Claims, 20 Drawing Sheets

TECHNIQUES FOR HANDLING OVERLAPPING SETS OF DOWNLINK CONTROL CHANNEL RESOURCES

CROSS REFERENCE

The present Application for Patent claims priority to U.S. Provisional Patent Application No. 62/480,995 by Lee, et al., entitled "Techniques For Handling Overlapping Sets of Downlink Control Channel Resources," filed Apr. 3, 2017, which is assigned to the assignee hereof and incorporated by reference herein.

BACKGROUND

Field of the Disclosure

The present disclosure relates to wireless communication systems, and more particularly to techniques for handling overlapping sets of downlink control channel resources such as overlapping downlink control resource sets or overlapping search spaces.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, otherwise known as UEs. In a Long-Term Evolution (LTE) or LTE-Advanced (LTE-A) network, a set of one or more base stations may define an eNodeB (eNB). In a next generation, new radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UEs on downlink channels (e.g., for transmissions from a base station to a UE) and uplink channels (e.g., for transmissions from a UE to a base station).

At times, a base station may transmit a downlink control channel to a UE. The downlink control channel may be transmitted to the UE on a downlink control resource set, and in some cases may be transmitted to the UE in a search space of the downlink control resource set. The search space may include all or a subset of the resources of the downlink control resource set. The downlink control channel may be transmitted on all or a subset of the resources of the downlink control resource set and/or all or a subset of the resources of the search space.

SUMMARY

Techniques are described for handling overlapping downlink control resource sets and search spaces. Some of the techniques enable a base station or UE to determine what signals may be transmitted/received in an overlap in resources between downlink control resource sets and/or search spaces. For example, some techniques enable a base station or UE to determine whether a downlink control channel and/or associated reference signals for the downlink control channel may be transmitted/received within the overlap. Other techniques enable a base station or UE to determine how a downlink control channel is rate matched around reference signals associated with other downlink control resource sets, search spaces, or other physical channels within the overlap.

A method of wireless communication at a user equipment (UE) is described. The method may include identifying a first control resource set and a second control resource set, wherein resources of the first control resource set at least partially overlap with resources of the second control resource set, monitoring a first search space of the first control resource set, wherein the monitoring the first search space comprises rate-matching first downlink control channel resources of the first control resource set for the first search space independently of the second control resource set, monitoring a second search space of the second control resource set, wherein the monitoring the second search space comprises rate-matching second downlink control channel resources of the second control resource set for the second search space independently of the first control resource set, and communicating with a base station based at least in part on control information identified as a result of the monitoring of the first search space or the monitoring of the second search space.

An apparatus for wireless communication is described. The apparatus may include means for identifying a first control resource set and a second control resource set, wherein resources of the first control resource set at least partially overlap with resources of the second control resource set, means for monitoring a first search space of the first control resource set, wherein the monitoring the first search space comprises rate-matching first downlink control channel resources of the first control resource set for the first search space independently of the second control resource set, means for monitoring a second search space of the second control resource set, wherein the monitoring the second search space comprises rate-matching second downlink control channel resources of the second control resource set for the second search space independently of the first control resource set, and means for communicating with a base station based at least in part on control information identified as a result of the monitoring of the first search space or the monitoring of the second search space.

Another apparatus for wireless communication is described. The apparatus may include a processor, memory in electronic communication with the processor, and instructions stored in the memory. The instructions may be operable to cause the processor to identify a first control resource set and a second control resource set, wherein resources of the first control resource set at least partially overlap with resources of the second control resource set, monitor a first search space of the first control resource set, wherein the monitoring the first search space comprises rate-matching first downlink control channel resources of the first control resource set for the first search space independently of the second control resource set, monitor a second search space of the second control resource set, wherein the monitoring the second search space comprises rate-matching second downlink control channel resources of the second control resource set for the second search space independently of the first control resource set, and communicate with a base station based at least in part on control information identified as a result of the monitoring of the first search space or the monitoring of the second search space.

A non-transitory computer-readable medium for wireless communication at a user equipment (UE) is described. The non-transitory computer-readable medium may include instructions operable to cause a processor to identify a first control resource set and a second control resource set, wherein resources of the first control resource set at least partially overlap with resources of the second control resource set, monitor a first search space of the first control resource set, wherein the monitoring the first search space comprises rate-matching first downlink control channel resources of the first control resource set for the first search space independently of the second control resource set, monitor a second search space of the second control resource set, wherein the monitoring the second search space comprises rate-matching second downlink control channel resources of the second control resource set for the second search space independently of the first control resource set, and communicate with a base station based at least in part on control information identified as a result of the monitoring of the first search space or the monitoring of the second search space.

Some examples of the method, apparatus, and non-transitory computer-readable medium described above may further include processes, features, means, or instructions for identifying first locations for a first set of reference signals associated with the first control resource set, wherein the monitoring the first search space comprises rate matching the first downlink control channel resources around the first locations.

Some examples of the method, apparatus, and non-transitory computer-readable medium described above may further include processes, features, means, or instructions for identifying second locations for a second set of reference signals associated with the second control resource set, wherein the monitoring the second search space comprises rate matching the second downlink control channel resources around the second locations.

In some examples of the method, apparatus, and non-transitory computer-readable medium described above, the first locations coincide with the second locations within the resources of the first control resource set that overlap with the resources of the second control resource set.

In some examples of the method, apparatus, and non-transitory computer-readable medium described above, the first locations may be non-coincident with the second locations within the resources of the first control resource set that overlap with the resources of the second control resource set.

In some examples of the method, apparatus, and non-transitory computer-readable medium described above, the monitoring the first search space comprises rate matching the first downlink control channel resources to the second locations within the resources of the first control resource set that overlap with the resources of the second control resource set.

In some examples of the method, apparatus, and non-transitory computer-readable medium described above, the rate matching the first downlink control channel resources to the second locations may be based at least in part on a type of the first control resource set and a type of the second control resource set.

In some examples of the method, apparatus, and non-transitory computer-readable medium described above, the monitoring the first search space comprises: demodulating one or more downlink control channel candidates of the first search space within the resources of the first control resource set that overlap with the resources of the second control resource set based at least in part on the first set of reference signals.

Some examples of the method, apparatus, and non-transitory computer-readable medium described above may further include processes, features, means, or instructions for determining that at least one reference signal associated with the first control resource set may be in a portion of resources that overlap with the second control resource set based at least in part on a type of the first control resource set and a type of the second control resource set.

A method of wireless communication at a user equipment (UE) is described. The method may include identifying a first control resource set configured for downlink control information for the UE, the first control resource set having first locations for a first set of reference signals, identifying a second control resource set, wherein resources of the first control resource set at least partially overlap with resources of the second control resource set, and wherein second locations for a second set of reference signals of the second control resource set are non-coincident with the first locations within the resources of the first control resource set that overlap with the resources of the second control resource set, monitoring a first search space of the first control resource set, wherein the monitoring the first search space comprises rate matching first downlink control channel resources of the first control resource set around the first locations and the second locations within the resources of the first control resource set that overlap with the resources of the second control resource set, and communicating with a base station based at least in part on control information identified as a result of the monitoring the first search space.

An apparatus for wireless communication is described. The apparatus may include means for identifying a first control resource set configured for downlink control information for the UE, the first control resource set having first locations for a first set of reference signals, means for identifying a second control resource set, wherein resources of the first control resource set at least partially overlap with resources of the second control resource set, and wherein second locations for a second set of reference signals of the second control resource set are non-coincident with the first locations within the resources of the first control resource set that overlap with the resources of the second control resource set, means for monitoring a first search space of the first control resource set, wherein the monitoring the first search space comprises rate matching first downlink control channel resources of the first control resource set around the first locations and the second locations within the resources of the first control resource set that overlap with the resources of the second control resource set, and means for communicating with a base station based at least in part on control information identified as a result of the monitoring the first search space.

Another apparatus for wireless communication is described. The apparatus may include a processor, memory in electronic communication with the processor, and instructions stored in the memory. The instructions may be operable to cause the processor to identify a first control resource set configured for downlink control information for the UE, the first control resource set having first locations for a first set of reference signals, identify a second control resource set, wherein resources of the first control resource set at least partially overlap with resources of the second control resource set, and wherein second locations for a second set of reference signals of the second control resource set are non-coincident with the first locations within the resources of the first control resource set that overlap with the resources of the second control resource set, monitor a first search space of the first control resource set, wherein the monitoring the first search space comprises rate matching first downlink control channel resources of the first control resource set around the first locations and the second locations within the resources of the first control resource set that overlap with the resources of the second control resource set, and communicate with a base station based at least in part on control information identified as a result of the monitoring the first search space.

A non-transitory computer-readable medium for wireless communication at a user equipment (UE) is described. The non-transitory computer-readable medium may include instructions operable to cause a processor to identify a first control resource set configured for downlink control information for the UE, the first control resource set having first locations for a first set of reference signals, identify a second control resource set, wherein resources of the first control resource set at least partially overlap with resources of the second control resource set, and wherein second locations for a second set of reference signals of the second control resource set are non-coincident with the first locations within the resources of the first control resource set that overlap with the resources of the second control resource set, monitor a first search space of the first control resource set, wherein the monitoring the first search space comprises rate matching first downlink control channel resources of the first control resource set around the first locations and the second locations within the resources of the first control resource set that overlap with the resources of the second control resource set, and communicate with a base station based at least in part on control information identified as a result of the monitoring the first search space.

Some examples of the method, apparatus, and non-transitory computer-readable medium described above may further include processes, features, means, or instructions for demodulating one or more downlink control channel candidates of the first search space within the resources of the first control resource set that overlap with the resources of the second control resource set based at least in part on the first set of reference signals, wherein the communicating with the base station may be based at least in part on the demodulating.

Some examples of the method, apparatus, and non-transitory computer-readable medium described above may further include processes, features, means, or instructions for determining that at least one reference signal associated with the first control resource set may be in a portion of resources that overlap with the second control resource set based at least in part on a type of the first control resource set and a type of the second control resource set.

In some examples of the method, apparatus, and non-transitory computer-readable medium described above, the monitoring the first search space comprises spatially processing the resources of the first control resource set that overlap with the resources of the second control resource set based at least in part on the first set of reference signals.

Some examples of the method, apparatus, and non-transitory computer-readable medium described above may further include processes, features, means, or instructions for identifying at least one physical channel transmitted on at least a portion of the first control resource set, wherein a downlink control channel may be rate matched around the at least one physical channel.

In one example, a method of wireless communication at a UE is described. The method may include identifying an overlap in resources between a first set of downlink control channel resources including a downlink control channel, and a second set of downlink control channel resources; identifying, based at least in part on the overlap, a set of reference signals associated with the downlink control channel; and demodulating the downlink control channel based at least in part on the set of reference signals.

In one example, an apparatus for wireless communication at a UE is described. The apparatus may include means for identifying an overlap in resources between a first set of downlink control channel resources including a downlink control channel, and a second set of downlink control channel resources; means for identifying, based at least in part on the overlap, a set of reference signals associated with the downlink control channel; and means for demodulating the downlink control channel based at least in part on the set of reference signals.

In one example, another apparatus for wireless communication at a UE is described. The apparatus may include a processor, memory in electronic communication with the processor, and instructions stored in the memory. The instructions may be executable by the processor to identify an overlap in resources between a first set of downlink control channel resources including a downlink control channel, and a second set of downlink control channel resources; to identify, based at least in part on the overlap, a set of reference signals associated with the downlink control channel; and to demodulate the downlink control channel based at least in part on the set of reference signals.

In one example, a non-transitory computer-readable medium storing computer-executable code for wireless communication at a UE is described. The code may be executable by a processor to identify an overlap in resources between a first set of downlink control channel resources including a downlink control channel, and a second set of downlink control channel resources; to identify, based at least in part on the overlap, a set of reference signals associated with the downlink control channel; and to demodulate the downlink control channel based at least in part on the set of reference signals.

In some examples of the method, apparatus, and non-transitory computer-readable medium described above, the first set of downlink control channel resources may be a first search space within a first downlink control resource set and the second set of downlink control channel resources may be a second search space. In some examples, the second search space may be a subset of resources of the first downlink control resource set.

In some examples of the method, apparatus, and non-transitory computer-readable medium described above, the first set of downlink control channel resources may be a first downlink control resource set and the second set of downlink control channel resources may be a second downlink control resource set.

Some examples of the method, apparatus, and non-transitory computer-readable medium described above may further include processes, features, means, or instructions for receiving at least a portion of the downlink control channel on resources of the first set of downlink control channel resources within the overlap. In some examples, the downlink control channel may be rate matched around the set of reference signals. In some examples, the method, apparatus, and non-transitory computer-readable medium may further include processes, features, means, or instructions for determining whether the downlink control channel is further rate matched around at least one reference signal associated with a second downlink control channel associated with the second set of downlink control channel resources based at least in part on a type of the first set of downlink control channel resources and a type of the second set of downlink control channel resources. In some examples, the method, apparatus, and non-transitory computer-readable medium may further include processes, features, means, or instructions for identifying at least one physical channel transmitted on at least a portion of the first set of downlink control channel resources, and the downlink control channel may be further rate matched around the at least one physical channel. In some examples, the method, apparatus, and non-transitory computer-readable medium may further include processes, features, means, or instructions for determining whether at least one reference signal associated with a second downlink control channel associated with the second set of downlink control channel resources is present in the overlap based at least in part on a type of the first set of downlink control channel resources and a type of the second set of downlink control channel resources. In some examples, the method, apparatus, and non-transitory computer-readable medium may further include processes, features, means, or instructions for spatially processing the set of reference signals associated with the downlink control channel based at least in part on the determining whether the at least one reference signal associated with the second downlink control channel is present in the overlap. In some examples, the at least one reference signal associated with the second downlink control channel may coincide with a reference signal of the set of reference signals associated with the downlink control channel.

Some examples of the method, apparatus, and non-transitory computer-readable medium described above may further include processes, features, means, or instructions for receiving the downlink control channel on resources of the first set of downlink control channel resources exclusive of the overlap. In some examples, the identifying the set of reference signals may include determining whether at least one reference signal in the set of reference signals is located in the overlap based at least in part on a type of the first set of downlink control channel resources.

In one example, a method of wireless communication at a base station is described. The method may include identifying an overlap in resources between a first set of downlink control channel resources and a second set of downlink control channel resources; identifying, based at least in part on the overlap, a set of reference signals associated with a downlink control channel for transmission on the first set of downlink control channel resources; and transmitting the downlink control channel and the set of reference signals on the first set of downlink control channel resources.

In one example, an apparatus for wireless communication at a base station is described. The apparatus may include means for identifying an overlap in resources between a first set of downlink control channel resources and a second set of downlink control channel resources; means for identifying, based at least in part on the overlap, a set of reference signals associated with a downlink control channel for transmission on the first set of downlink control channel resources; and means for transmitting the downlink control channel and the set of reference signals on the first set of downlink control channel resources.

In one example, another apparatus for wireless communication at a base station is described. The apparatus may include a processor, memory in electronic communication with the processor, and instructions stored in the memory. The instructions may be executable by the processor to identify an overlap in resources between a first set of downlink control channel resources and a second set of downlink control channel resources; to identify, based at least in part on the overlap, a set of reference signals associated with a downlink control channel for transmission on the first set of downlink control channel resources; and to transmit the downlink control channel and the set of reference signals on the first set of downlink control channel resources.

In one example, a non-transitory computer-readable medium storing computer-executable code for wireless communication at a base station is described. The code may be executable by a processor to identify an overlap in resources between a first set of downlink control channel resources and a second set of downlink control channel resources; to identify, based at least in part on the overlap, a set of reference signals associated with a downlink control channel for transmission on the first set of downlink control channel resources; and to transmit the downlink control channel and the set of reference signals on the first set of downlink control channel resources.

In some examples of the method, apparatus, and non-transitory computer-readable medium described above, the first set of downlink control channel resources may be a first search space within a first downlink control resource set and the second set of downlink control channel resources may be a second search space. In some examples, the second search space may be a subset of resources of the first downlink control resource set.

In some examples of the method, apparatus, and non-transitory computer-readable medium described above, the first set of downlink control channel resources may be a first downlink control resource set and the second set of downlink control channel resources may be a second downlink control resource set.

Some examples of the method, apparatus, and non-transitory computer-readable medium described above may further include processes, features, means, or instructions for transmitting at least a portion of the downlink control channel on resources of the first set of downlink control channel resources within the overlap. In some examples, the method, apparatus, and non-transitory computer-readable medium may further include processes, features, means, or instructions for rate matching the downlink control channel around the set of reference signals. In some examples, the method, apparatus, and non-transitory computer-readable medium may further include processes, features, means, or instructions for determining whether to rate match the downlink control channel around at least one reference signal associated with a second downlink control channel associated with the second set of downlink control channel resources based at least in part on a type of the first set of downlink control channel resources and a type of the second set of downlink control channel resources. In some examples, the method, apparatus, and non-transitory computer-readable medium may further include processes, features, means, or instructions for rate matching the downlink control channel around at least one physical channel transmitted on at least a portion of the first set of downlink control channel resources. In some examples, the method, apparatus, and non-transitory computer-readable medium may further include processes, features, means, or instructions for determining whether to transmit at least one reference signal associated with a second downlink control channel associated with the second set of downlink control channel resources in the overlap based at least in part on a type of the first set of downlink control channel resources and a type of the second set of downlink control channel resources. In some examples, the method, apparatus, and non-transitory computer-readable medium may further include processes, features, means, or instructions for spatially processing the set of reference signals associated with the downlink control channel based at least in part on the determining whether the at least one reference signal associated with the second downlink control channel is to be transmitted in the overlap. In some examples, the at least one reference signal associated with the second downlink control channel may coincide with a reference signal of the set of reference signals associated with the downlink control channel.

Some examples of the method, apparatus, and non-transitory computer-readable medium described above may further include processes, features, means, or instructions for transmitting the downlink control channel on resources of the first set of downlink control channel resources exclusive of the overlap. In some examples, the identifying the set of reference signals may include determining whether to transmit at least one reference signal in the set of reference signals in the overlap based at least in part on a type of the first set of downlink control channel resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
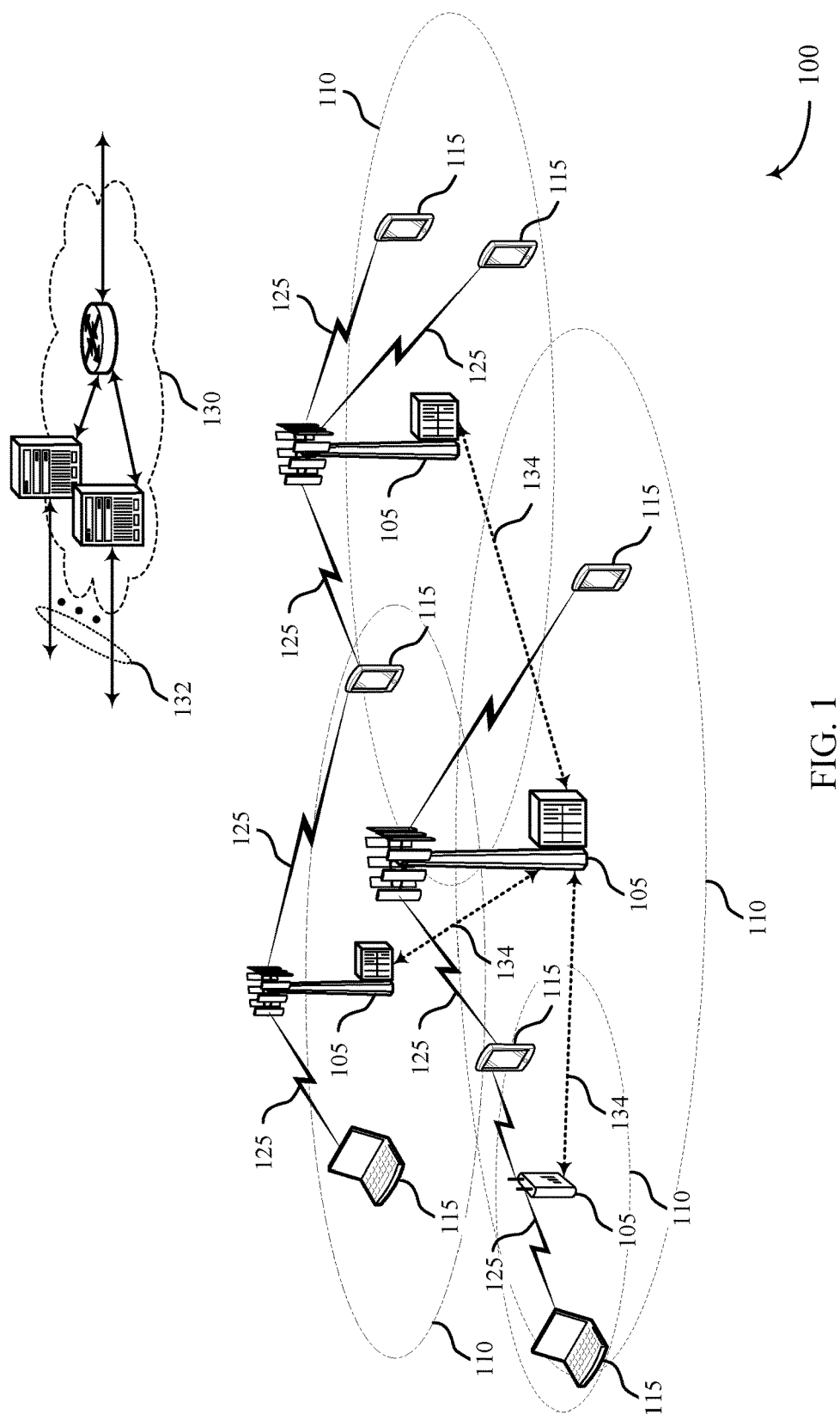
FIG. 1 shows an example of a wireless communication system, in accordance with various aspects of the present disclosure.

In some wireless communication systems (e.g., in an NR or 5G wireless communication system), a control resource set (e.g., a downlink control resource set) and/or search space may configured for transmission of a downlink control channel. For purposes of this disclosure, a downlink control resource set includes a set of resources on which one or more search spaces can be defined, or a set of resources on which one or more downlink control channels may be transmitted. One or more downlink control channels may be transmitted over a downlink control resource set, which may include one or more search spaces defining regions for transmission of different downlink control channels. A downlink control channel may be transmitted on one of multiple candidate locations within a search space. Reference signals (e.g., demodulation reference signals (DMRS)) may be associated with downlink control resource sets, search spaces, or downlink control channels.

A downlink control resource set may be common or UE-specific. A search space may also be common or UE-specific. A UE-specific downlink control resource set or UE-specific search space may be configured for a UE or group of UEs. In some cases, multiple downlink control resource sets may be configured. For example, a base station may transmit configuration information for a common downlink control resource set in a master information block (MIB) or other system information (SI) transmission, and may transmit configuration information for one or more UE-specific downlink control resource sets in radio resource control (RRC) signaling. The base station may also transmit, in SI or RRC signaling for example, configuration information for one or more search spaces defined within each downlink control resource set.

In some cases, different downlink control resource sets, or different search spaces (e.g., within the same or different downlink control resource sets), may overlap. In these cases, a base station or UE may determine what signals may be transmitted/received in an overlap in resources between downlink control resource sets and/or search spaces. A base station or UE may also determine whether to rate match a downlink control channel (or whether a downlink control channel is rate matched) around reference signals associated with other downlink control resource sets, other search spaces, or other physical channels within the overlap.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

FIG. 1 shows an example of a wireless communication system 100, in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques.

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) or gNodeBs (gNBs).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

At times, a base station 105 may transmit a downlink control channel to one or more UEs 115. A base station 105 may also transmit different downlink control channels to different UEs 115. Some downlink control channels may be transmitted as common downlink control channels (e.g., to all UEs 115 within a base station's coverage area 110). Other downlink control channels may be transmitted as UE-specific downlink control channels (e.g., to one or a subset of UEs 115 within a base station's coverage area 110).

Figure 2:
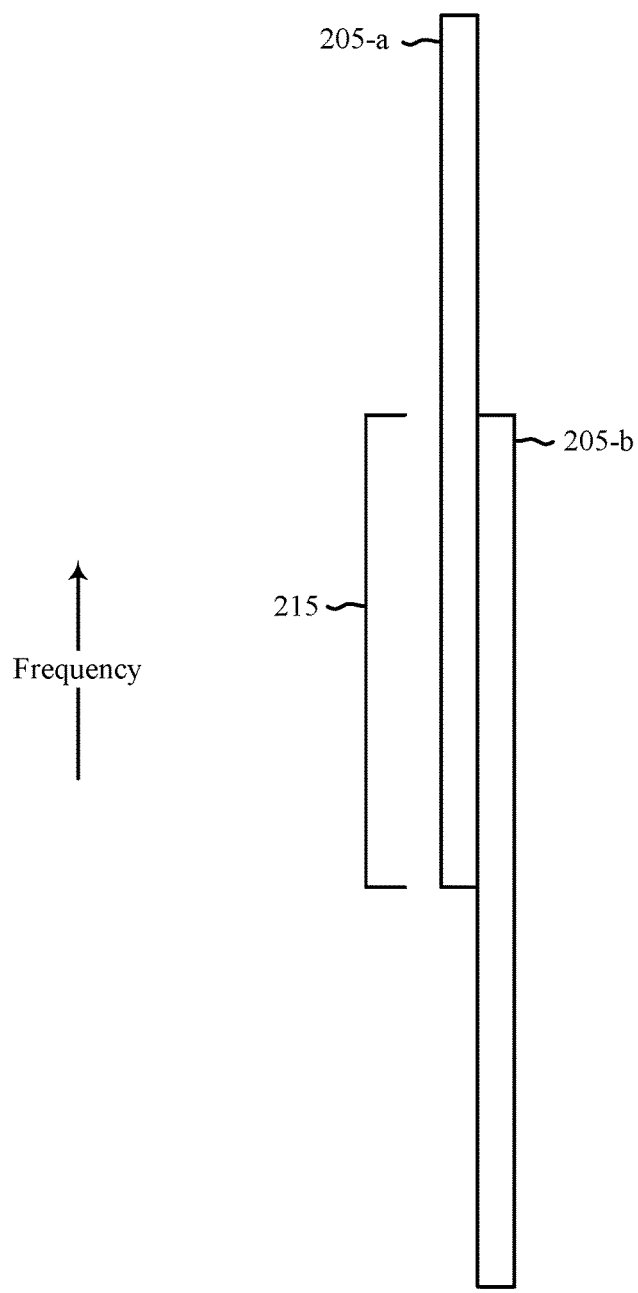
FIG. 2 shows a frequency range in which overlapping downlink control resource sets are defined, in accordance with various aspects of the present disclosure.

FIG. 2 shows a frequency range 200 in which overlapping downlink control resource sets 205 are defined, in accordance with various aspects of the present disclosure. Although the overlapping downlink control resource sets 205-a and 205-b are shown side-by-side, this is just for illustration purposes, and the downlink control resource sets 205-a and 205-b include the same resources within an overlap 215 (i.e., the overlap 215 of the downlink control resource sets 205-a and 205-b includes the same frequency resources in the same time period). In some examples, the downlink control resource sets 205 and 205-b may span more than one time period (e.g., more than one symbol period), and may overlap in frequency in some or all of the time periods.

In some examples, each of the downlink control resource sets 205-a and 205-b may be common or UE-specific (e.g., a first downlink control resource set 205-a may be common and a second downlink control resource set 205-b may be UE-specific, or both downlink control resource sets 205-a and 205-b may be UE-specific, etc.). The first downlink control resource set 205-a may be used to transmit/receive a first downlink control channel, and the second downlink control resource set 205-b may be used to transmit/receive a second downlink control channel. The downlink control channels may or may not be transmitted at the same time (e.g., within the same slot), and each may use a portion of the respective downlink control resource set, such that only one (or neither) of the downlink control channels may be transmitted in the overlap 215 for a given slot and spatial layer.

Figure 3:
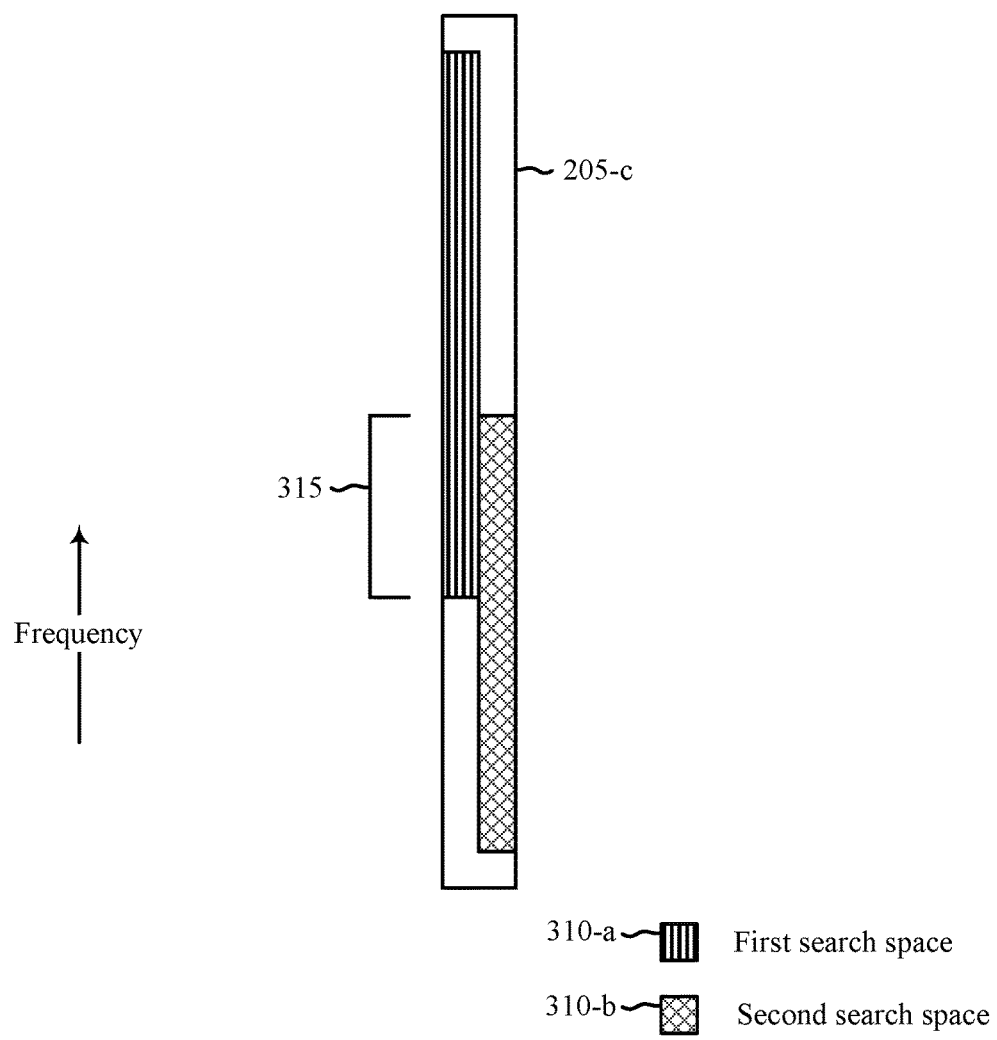
FIG. 3 shows a downlink control resource set 300 in which overlapping search spaces 305 and 310 are defined, in accordance with various aspects of the present disclosure.

FIG. 3 shows a downlink control resource set 300 in which overlapping search spaces 305 are defined, in accordance with various aspects of the present disclosure. Although the overlapping search spaces 310-a and 310-b are shown side-by-side, this is just for illustration purposes, and the search spaces 310-a and 310-b are defined to include the same resources within an overlap 315 (i.e., the overlap 315 of the search spaces 310-a and 310-b includes the same frequency resources in the same time period). In some examples, the search spaces 310-a and 310-b may span more than one time period (e.g., more than one symbol period of a slot), and may overlap in frequency in some or all of the time periods.

In some examples, each of the search spaces 310-a and 310-b may be common or UE-specific (e.g., a first search space 310-a may be common and a second search space 310-b may be UE-specific, or both search spaces 310-a and 310-b may be UE-specific, etc.). The first search space 310-a may be used to transmit/receive a first downlink control channel, and the second search space 310-b may be used to transmit/receive a second downlink control channel. The downlink control channels may or may not be transmitted at the same time (e.g., within the same slot), and each may use a portion of the respective search spaces, such that only one (or neither) of the downlink control channels may be transmitted in the overlap 315 for a given slot and spatial layer. In some examples, the search spaces 310-a and 310-b may be configured within a same downlink control resource set 205-c. In other examples, the search spaces 310-a and 310-b may be configured within different downlink control resource sets 205 (not shown).

Given the overlap 215 or the overlap 315 described with reference to FIG. 2 or 3, one or more rules may be established for transmitting/receiving a downlink control channel in downlink control resource sets or search spaces having the overlap 215 or overlap 315. In some examples, a first rule may indicate that signaling associated with the first downlink control resource set 205-a (e.g., a downlink control channel or reference signals) and signaling associated with the second downlink control resource set 205-b may not be transmitted on overlapping resources within the overlap 215. The rule may also be applied to signaling associated with the first search space 310-a (e.g., a downlink control channel or reference signals) and signaling associated with the second search space 310-b (e.g., a downlink control channel or reference signals). In some examples, the first rule may be applied based on a "type" associated with the downlink control resource sets 205 or based on a type associated with the search spaces 310-a. For example, the first rule may be applied when both of the downlink control resource sets 205-a and 205-b (or both of the search spaces 310-a and 310-b) are UE-specific, but not when the downlink control resource sets 205-a and 205-b (or search spaces 310-a and 310-b) are of different types (e.g., when one of the downlink control resource sets 205 and 205-b is UE-specific, and the other is common).

In some examples, a second rule may indicate that some signaling associated with overlapping downlink control resource sets 205 (e.g., multiple downlink control channels) may not be transmitted on overlapping resources, while other signaling (e.g., reference signals associated with one downlink control resource set and a downlink control channel for another downlink control resource set) may be transmitted on overlapping resources within the overlap 215. The rule may also be applied to signaling associated with the search spaces 310 (e.g., multiple downlink control channels may not overlap while reference signals associated with one search space may overlap with a downlink control channel transmitted in another search space). In some examples, the second rule may be applied based on a type associated with the downlink control resource sets 205, or based on a type associated with the search spaces 310. For example, the second rule may be applied when the downlink control resource sets 205 (or search spaces 310) are of different types (e.g., when one of the downlink control resource sets 205 is UE-specific, and the other is common), but not when both of the downlink control resource sets 205 (or both of the search spaces 310) are of the same type (e.g., UE-specific). In some examples, reference signals associated with a common downlink control resource set or common search space may be transmitted across the common downlink control resource set or common search space in each slot.

In some examples, a third rule may indicate that signaling associated with the first downlink control resource set 205-a (e.g., a downlink control channel or reference signals) and signaling associated with the second downlink control resource set 205-*b* may be transmitted on overlapping resources within the overlap 215. For example, the third rule may be applied when spatial processing is used to distinguish the signaling for overlapping resources. In some examples, the spatial processing may include beamforming (i.e., transmitting on directional beams) or space division multiplexing. For example, the third rule may be applied when it is determined that downlink control resource sets 205, or search spaces 310 are configured on spatially orthogonal resources or beamforming is applied to at least one of the downlink control resource sets 205 or search spaces 310. In some examples, UE-specific downlink control resource sets 205 or search spaces 310 may have beamforming applied, and therefore a downlink control channel transmission or reference signals may be transmitted on resources of a UE-specific downlink control resource set 205 or search space 310 that overlaps with a downlink control channel transmission or reference signals transmitted on a non-beamformed (e.g., common) downlink control resource set 205 or search space 310.

When reference signals or physical channels (e.g., a downlink control channel or other physical channel) are simultaneously transmitted on overlapping resources of different downlink control resource sets (or in different search spaces), rate matching may need to take into account the concurrent transmissions.

Figure 4:
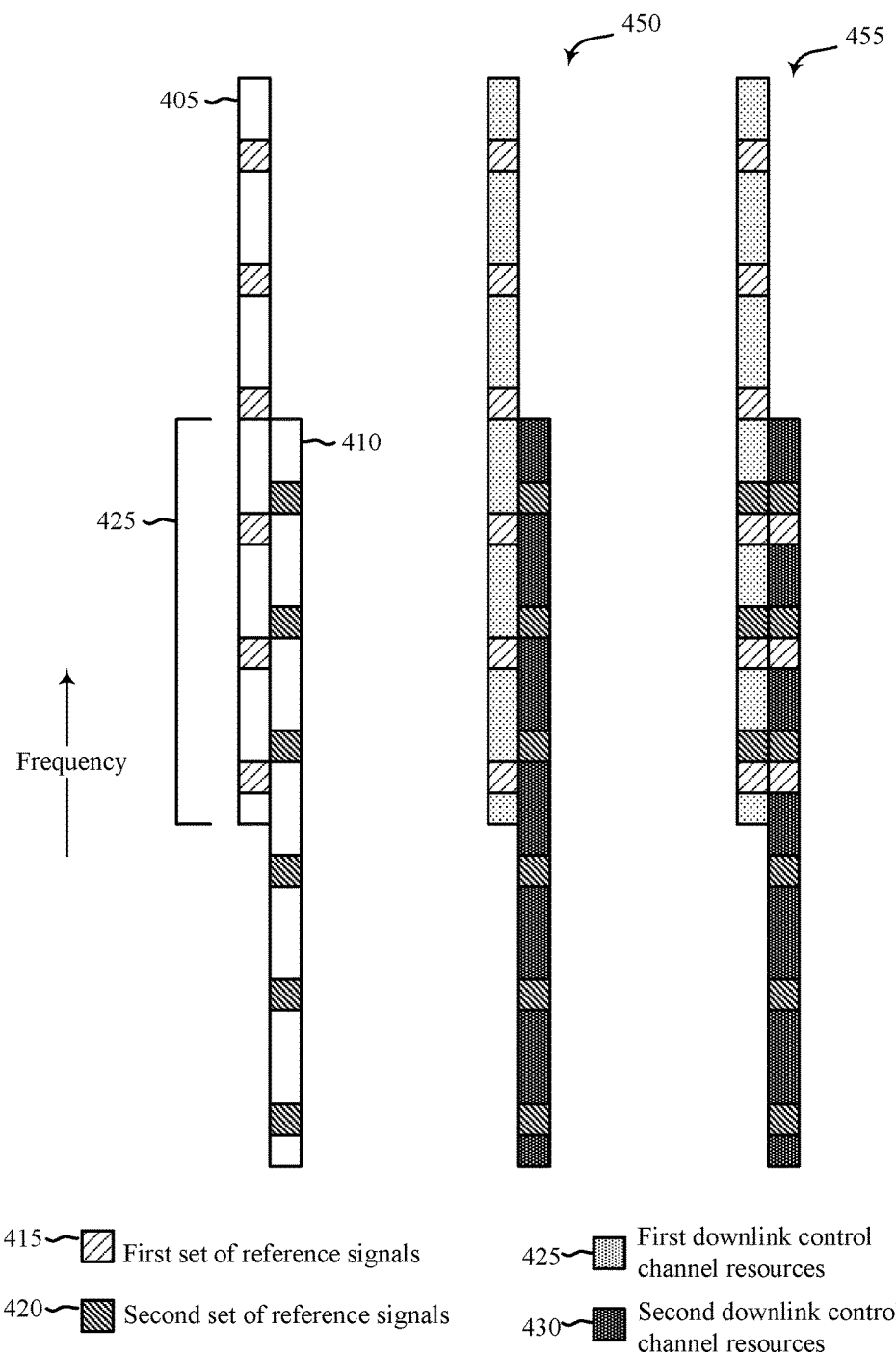
FIGS. 4 and 5 show a frequency range in which overlapping sets of downlink control channel resources are defined, in accordance with various aspects of the present disclosure.

FIG. 4 shows a frequency range 400 in which overlapping sets of downlink control channel resources 405 and 410 are defined, in accordance with various aspects of the present disclosure. The overlapping sets of downlink control channel resources may be overlapping downlink control resource sets, as described with reference to FIG. 2, or overlapping search spaces, as described with reference to FIG. 3. The overlapping sets of downlink control channel resources 405 and 410 may overlap in a region 425. A first set of downlink control channel resources may be used to transmit a first downlink control channel associated with a first set of reference signals 415, and a second set of downlink control channel resources may be used to transmit a second downlink control channel associated with a second set of reference signals 420. The first set of reference signals 415 and second set of reference signals 420 may be transmitted on different resource elements (REs) within the region 425.

In some examples, the first downlink control channel may assume the existence of just its own set of reference signals (i.e., the first set of reference signals 415) and may be rate matched to just the first set of reference signals 415. Similarly, the second downlink control channel may assume the existence of just its own set of reference signals (i.e., the second set of reference signals 420) and may be rate matched to just the second set of reference signals 420.

In some examples, the first downlink control channel may assume the existence of the first set of reference signals 415 and the second set of reference signals 420, and may be rate matched to both the first set of reference signals 415 and the second set of reference signals 420. Similarly, the second downlink control channel may assume the existence of both the first set of reference signals 415 and the second set of reference signals 420, and may be rate matched to both the first set of reference signals 415 and the second set of reference signals 420. A determination of rate matching may depend on the types of downlink control channel resources. For example, where a downlink control channel in UE-specific downlink control channel resources overlaps with a set of common downlink control channel resources, a determination may be made that the downlink control channel is rate matched around the first and second sets of reference signals. In contrast, where a downlink control channel in a first set of UE-specific downlink control channel resources overlaps with a second set of UE-specific downlink control channel resources, a determination may be made that the downlink control channel is rate matched around only the first set of reference signals.

Figure 5:
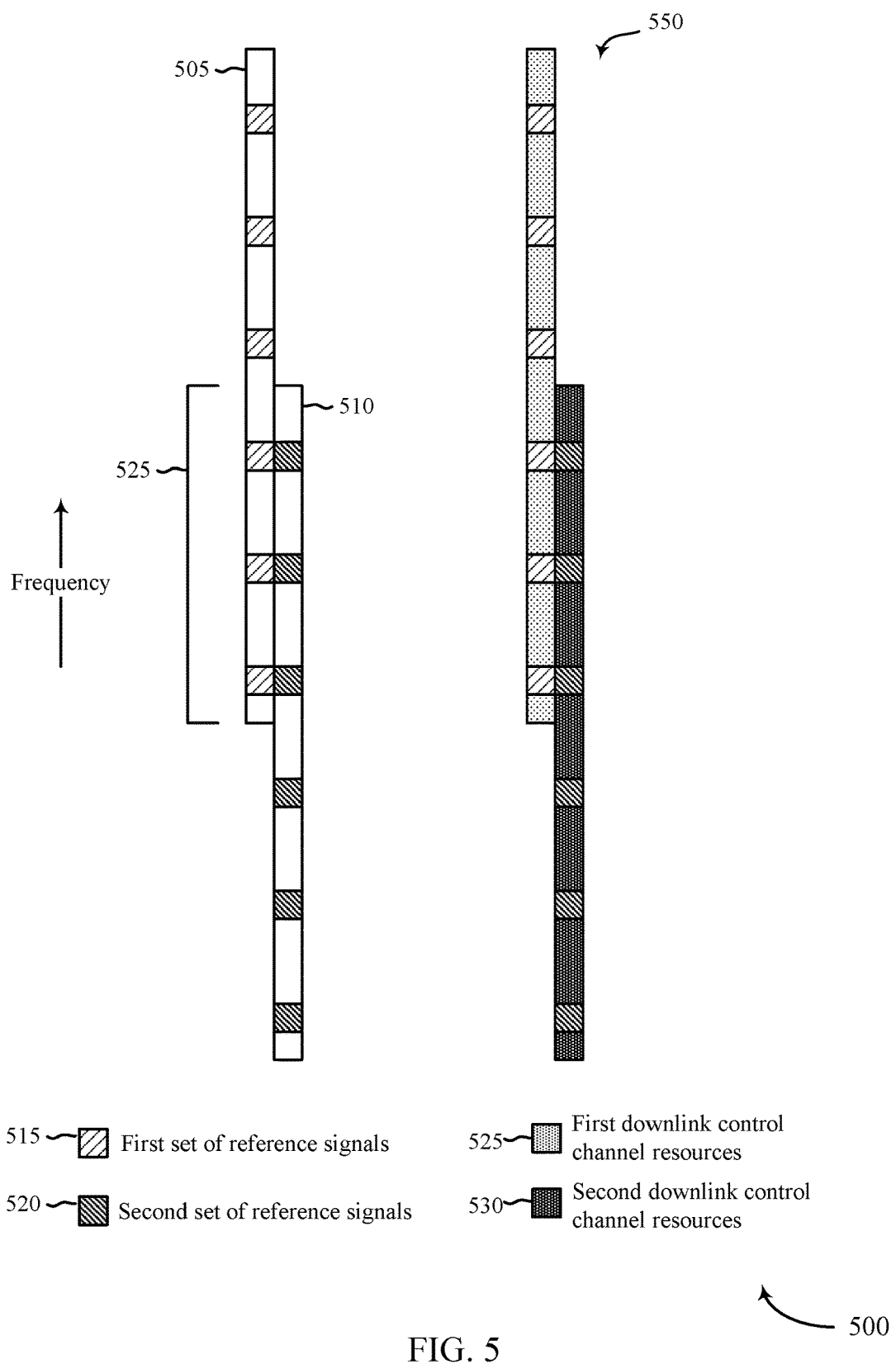

FIG. 5 shows a frequency range 500 in which overlapping sets of downlink control channel resources 505 and 510 are defined, in accordance with various aspects of the present disclosure. The overlapping sets of downlink control channel resources may be overlapping downlink control resource sets, as described with reference to FIG. 2, or overlapping search spaces, as described with reference to FIG. 3. The overlapping sets of downlink control channel resources 505 and 510 may overlap in a region 525. A first set of downlink control channel resources may be used to transmit a first downlink control channel associated with a first set of reference signals 515, and a second set of downlink control channel resources may be used to transmit a second downlink control channel associated with a second set of reference signals 520. The first set of reference signals 515 and second set of reference signals 520 may be configured for transmission on the same REs within the region 525 (i.e., the REs used by the first set of reference signals 515 and the second set of reference signals 520, within the region 525, may coincide).

Where a downlink control channel of a first set of downlink channel resources is transmitted on resources that overlap a second set of downlink channel resources having reference signals configured for transmission on the same REs, rate matching within the overlapping resources may be to just its own set of reference signals (i.e., the first set of reference signals 515). Where REs are shared for different sets of downlink channel resources, UEs may not assume the presence of reference signals in regions of overlap with other sets of downlink channel resources. For example, where a common set of downlink control channel resources 505 overlaps with a UE-specific set of downlink control channel resources 510, a UE may not utilize portions of a reference signal for the UE-specific set of downlink control channel resources 510 in the region 525 unless part of a downlink control channel. That is, the second set of reference signals 520 of region 525 that are part of a downlink control channel (e.g., within CCEs associated with the downlink control channel) may be utilized by the UE, while any others of the second set of reference signals 520 of region 525 may be not utilized by the UE for channel estimation or demodulation of the downlink control channel.

In some examples, a downlink control channel of a set of downlink control channel resources may be rate matched to other physical channels of its own set of downlink control channel resources or other sets of downlink control channel resources. In some cases, determination of the other physical channels may be based at least in part on the type of downlink control channel resources on which the downlink control channel is transmitted (e.g., common or UE-specific), or based at least in part on the type of the other sets of downlink control channel resources. For example, a UE may detect a downlink control channel of a set of UE-specific downlink control channel resources that overlaps with a set of common downlink control channel resources, and determine the presence of a physical channel in the set of common downlink control channel resources used for rate matching based on the type of the set of common downlink control channel resources.

As described above with reference to FIGS. 4 and 5, a UE 115 may be configured to receive and decode control information via multiple control resource sets having overlapped resources. The control resource sets in a given transmission time interval (e.g., subframe, slot, mini-slot, etc.) may be overlapped in a variety of different ways. For example, different control resource sets may partially or fully overlap, and partially overlapping control resource sets may include coincident or non-coincident reference signals. For example, a first control resource set may have a starting resource block or subcarrier that is different than a second control resource set, resulting in the reference signals of the first control resource set being offset from the reference signals of the second control resource set, as is shown in FIG. 4. Alternatively, the reference signals of the first control resource set may be aligned with the reference signals of the second control resource set, as is shown in FIG. 5.

The UE 115 may monitor a first search space of the first control resource set. As part of the monitoring, the UE 115 may rate-match first downlink control channel resources of the first control resource set for the first search space independently of the second control resource set. Referring back to FIG. 4, UE 115 may monitor first downlink control channel resources 425 of the first control resource set 405 independently of the second control resource set 410 as shown in control resource mapping 450. For example, UE 115 may rate match the first downlink control channel resources 425 based on the first set of reference signals 415 and independently of the second set of reference signals 420. That is, UE 115 may rate match the first downlink control channel resources 425 to resources of the first control resource set 405 to which the second set of reference signals 420 are mapped. The UE 115 may be configured with one or more search spaces for the first control resource set 405, and may monitor the one or more search spaces mapped to the first downlink control channel resources 425. Similarly, as shown in control resource mapping 550 in FIG. 5, the UE may rate-match first downlink control channel resources 525 of the first control resource set 505 for the first search space independently of the second control resource set 510 where reference signals for the first and second control resource sets are coincident in the overlapping resources of the control resource sets.

As also shown in control resource mappings 450 and 550 in FIGS. 4 and 5, the UE 115 may also monitor a second search space of the second control resource set. As part of the monitoring, the UE 115 may rate-match second downlink control channel resources 430, 530 of the second control resource set 410, 510 for the second search space independently of the first control resource set 405, 505.

As part of the monitoring of both a first search space in a first control resource set and a second search space in a second control resource set, the UE 115 may identify locations for the sets of reference signals associated with their respective control resource sets. For example, monitoring the first search space by the UE 115 may include rate matching the first downlink control channel resources around locations of a first set of references signals associated with the first control resource set. Further, monitoring the second search space by the UE 115 may include rate matching the second downlink control channel resources around locations of a second set of references signals associated with the second control resource set. In some cases, as is shown in FIG. 4, the locations of the reference signals in the different control resource sets may be non-coincident. In some cases, as is shown in FIG. 5, the locations of the reference signals in the different control resource sets may coincide. Thus, when demodulating one or more downlink control channel candidates of the first search space within the resources of the first control resource set that overlap with the resources of the second control resource set, the UE 115 may assume the presence of the first set of reference signals for channel estimation for the demodulating. In addition, when demodulating one or more downlink control channel candidates of the second search space within the resources of the second control resource set that overlap with the resources of the first control resource set, the UE 115 may assume the presence of the second set of reference signals for channel estimation for the demodulating. In these examples, coincident resources of the first and second downlink control channel resources may not be used at the same time (e.g., in overlapping time resources).

In some cases, the UE 115 may rate match downlink control channel resources associated with a first search space and a first control resource set around locations of reference signals for a second search space and a second control resource set. For example, where coincident use of control channel resources is applicable (e.g., MIMO), the control information may be multiplexed over multiple layers in the same time-frequency resources but reference signals may be transmitted using orthogonal time-frequency resources. Thus, when two control resource sets overlap, control information for one control resource set may not be present in the resource elements that contain reference signals for the other control resource set. For example, as shown in control resource mapping 455 in FIG. 4, first downlink control channel resources 425 may be rate matched around the first set of reference signals 415 and the second set of reference signals 420 in the portion of the first control resource set 405 that overlaps the second control resource set 410. Similarly, the second downlink control channel resources 430 may be rate matched around the first set of reference signals 415 and the second set of reference signals 420 in the portion of the second control resource set 410 that overlaps the first control resource set 405.

In some cases, the UE 115 may determine a type of control resource sets that may be overlapped. The UE 115 may apply rate matching based on the types of control resource sets that may be overlapped. Types of control resource sets may include a common control resource set or a UE-specific control resource set.

Once the UE 115 identifies the reference signals for either control resource set or both control resource sets, the UE 115 may demodulate one or more blind decoding candidates (e.g., downlink control channel candidates) of the search space using the identified reference signals. In some cases, the UE 115 may apply rate matching to portions of the control resource sets that may overlap (when such information is known). In some cases, the UE 115 may apply different rules to portions of the search spaces that overlap and portions of the search spaces that do not overlap.

In some cases, overlapping control resource sets and/or overlapping search spaces may be used in the context of a multiple in multiple out (MIMO) communications. For example, such overlaps may be in multi-user MIMO (MU-MIMO) communications. The UE 115 may spatially process the resources of one of the control resource sets that overlaps another control resource set based on the reference signals of the first control resource set. It should be noted that control resource mappings 450, 455, and 550 should be understood as overlapping in time and are illustrated side-by-side for ease of illustration.

Figure 6:
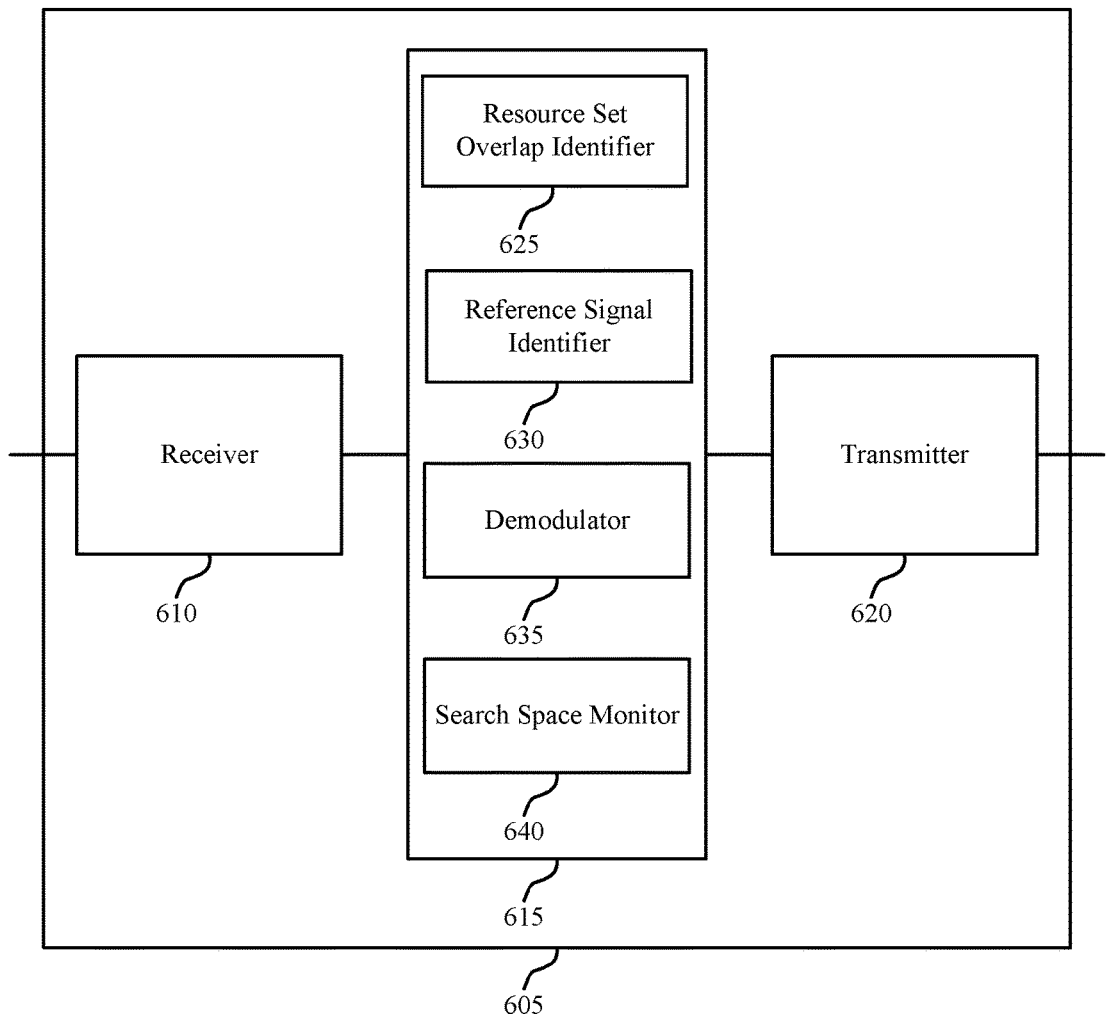
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the UEs described with reference to FIG. 1. The apparatus 605 may include a receiver 610, a wireless communication manager 615, and a transmitter 620. The apparatus 605 may also include a processor. Each of these components may be in communication with one another (e.g., via one or more buses).

The receiver 610 may receive data or control signals or information (i.e., transmissions), some or all of which may be associated with various information channels (e.g., data channels, control channels, etc.). In some examples, the receiver 610 may be used to receive a downlink control channel and associated set of reference signals. Received signals or information, or measurements performed thereon, may be passed to other components of the apparatus 605.

The transmitter 620 may transmit data or control signals or information (i.e., transmissions) generated by other components of the apparatus 605, some or all of which may be associated with various information channels (e.g., data channels, control channels, etc.). In some examples, the transmitter 620 may be collocated with the receiver 610 in a transceiver. For example, the transmitter 620 and receiver 610 may be an example of aspects of the transceiver(s) 1030 described with reference to FIG. 10.

The wireless communication manager 615 and/or at least some of its various sub-components may be implemented in hardware, software executed by a processor, firmware, or any combination thereof. If implemented in software executed by a processor, the functions of the wireless communication manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communication manager 615 and/or at least some of its various sub-components may be physically located at various positions, including being distributed such that portions of functions are implemented at different physical locations by one or more physical devices. In some examples, the wireless communication manager 615 and/or at least some of its various sub-components may be a separate and distinct component in accordance with various aspects of the present disclosure. In other examples, the wireless communication manager 615 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 615 may include a resource set overlap identifier 625, a reference signal identifier 630, a demodulator 635, and a search space monitor 640.

The resource set overlap identifier 625 may be used to identify an overlap in resources between a first set of downlink control channel resources including a downlink control channel, and a second set of downlink control channel resources, as described for example with reference to FIGS. 2-5. In some examples, the first set of downlink control channel resources may be a first search space within a downlink control resource set, and the second set of downlink control channel resources may be a second search space. In other examples, the first set of downlink control channel resources may be a first downlink control resource set and the second set of downlink control channel resources may be a second downlink control resource set (and in some of these examples, the first downlink control channel may be further included in a search space of the first downlink control resource set).

The reference signal identifier 630 may be used to identify, based at least in part on the overlap, a set of reference signals associated with the downlink control channel, as described for example with reference to FIGS. 2-5.

Search space monitor 640 may identify a first control resource set and a second control resource set, where resources of the first control resource set at least partially overlap with resources of the second control resource set, identify at least one physical channel transmitted on at least a portion of the first control resource set, where a downlink control channel is rate matched around the at least one physical channel, monitor a second search space of the second control resource set, where the monitoring the second search space includes rate-matching second downlink control channel resources of the second control resource set for the second search space independently of the first control resource set, communicate with a base station based on control information identified as a result of the monitoring of the first search space or the monitoring of the second search space, monitor a first search space of the first control resource set, where the monitoring the first search space includes rate-matching first downlink control channel resources of the first control resource set for the first search space independently of the second control resource set, identify a second control resource set, where resources of the first control resource set at least partially overlap with resources of the second control resource set, and where second locations for a second set of reference signals of the second control resource set are non-coincident with the first locations within the resources of the first control resource set that overlap with the resources of the second control resource set, monitor a first search space of the first control resource set, where the monitoring the first search space includes rate matching first downlink control channel resources of the first control resource set around the first locations and the second locations within the resources of the first control resource set that overlap with the resources of the second control resource set, communicate with a base station based on control information identified as a result of the monitoring the first search space, and Search space monitor 640 may identify a first control resource set configured for downlink control information for the UE, the first control resource set having first locations for a first set of reference signals. In some cases, the monitoring the first search space includes rate matching the first downlink control channel resources to the second locations within the resources of the first control resource set that overlap with the resources of the second control resource set. In some cases, the rate matching the first downlink control channel resources to the second locations is based on a type of the first control resource set and a type of the second control resource set. In some cases, the monitoring the first search space includes spatially processing the resources of the first control resource set that overlap with the resources of the second control resource set based on the first set of reference signals.

In some examples, the receiver 610 may be used to receive the downlink control channel on a subset of resources of the first search space (e.g., when the identified overlap is between the first search space and the second search space), as described for example with reference to FIGS. 2-5. The subset of resources may be at least partially within the overlap.

The demodulator 635 may be used to demodulate the downlink control channel based at least in part on the set of reference signals, as described for example with reference to FIGS. 2-5.

Figure 7:
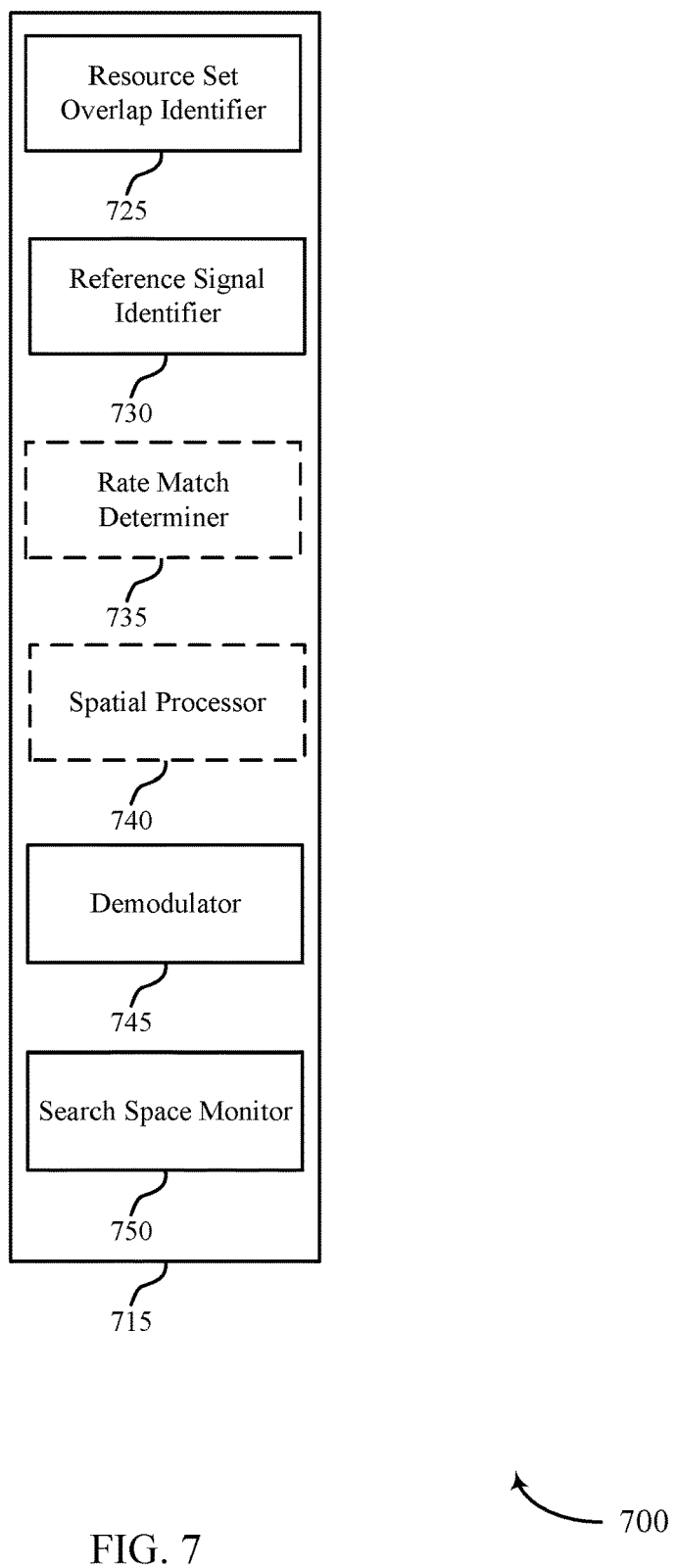
FIG. 7 shows a block diagram of a wireless communication manager, in accordance with various aspects of the present disclosure.

FIG. 7 shows a block diagram 700 of a wireless communication manager 715, in accordance with various aspects of the present disclosure. The wireless communication manager 715 may be an example of aspects of the wireless communication manager described with reference to FIG. 6. The wireless communication manager 715 may include a resource set overlap identifier 725, a reference signal identifier 730, an optional rate match determiner 735, an optional spatial processor 740, and a demodulator 745. Each of these components may communicate, directly or indirectly, with one another (e.g., via one or more buses). The resource set overlap identifier 725, reference signal identifier 730, and demodulator 745 may be examples of the overlap identifier 625, reference signal identifier 630, demodulator 635, and a search space monitor 640 described with reference to FIG. 6.

The resource set overlap identifier 725 may be used to identify an overlap in resources between a first set of downlink control channel resources including a downlink control channel, and a second set of downlink control channel resources, as described for example with reference to FIGS. 2-5. In some examples, the first set of downlink control channel resources may be a first search space within a first downlink control resource set, and the second set of downlink control channel resources may be a second search space, which may be within the first downlink control resource set or a second downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set).

The reference signal identifier 730 may be used to identify, based at least in part on the overlap, a set of reference signals associated with the downlink control channel, as described for example with reference to FIGS. 2-5. In some examples, identifying the set of reference signals may include determining whether at least one reference signal in the set of reference signals is located in the overlap based at least in part on a type of the first set of downlink control channel resources.

The rate match determiner 735 may be used to determine whether the downlink control channel is rate matched around at least one reference signal associated with a second downlink control channel associated with the second set of downlink control channel resources, as described for example with reference to FIGS. 2-5. The determination may be based at least in part on a type of the first set of downlink control channel resources and a type of the second set of downlink control channel resources.

The rate match determiner 735 may also or alternatively be used to identify at least one physical channel transmitted on at least a portion of the first set of downlink control channel resources, as described for example with reference to FIGS. 2-5.

The reference signal identifier 730 may also be used to determine whether at least one reference signal associated with the second set of downlink control channel resources is present in the overlap, as described for example with reference to FIGS. 2-5. The determination may be based at least in part on the type of the first set of downlink control channel resources and the type of the second set of downlink control channel resources. In some examples, the at least one reference signal associated with the second downlink control channel may coincide with a reference signal of the set of reference signals associated with the downlink control channel.

Reference signal identifier 730 may identify first locations for a first set of reference signals associated with the first control resource set, where the monitoring the first search space includes rate matching the first downlink control channel resources around the first locations, identify second locations for a second set of reference signals associated with the second control resource set, where the monitoring the second search space includes rate matching the second downlink control channel resources around the second locations, and determine that at least one reference signal associated with the first control resource set is in a portion of resources that overlap with the second control resource set based on a type of the first control resource set and a type of the second control resource set. In some cases, the first locations coincide with the second locations within the resources of the first control resource set that overlap with the resources of the second control resource set. In some cases, the first locations are non-coincident with the second locations within the resources of the first control resource set that overlap with the resources of the second control resource set.

In some examples, a receiver of an apparatus including the wireless communication manager 715 may be used to receive at least a portion of the downlink control channel on resources of the first set of downlink control channel resources within the overlap, as described for example with reference to FIGS. 2-5. In some of these examples, the downlink control channel may be rate matched around the set of reference signals. The downlink control channel may also or alternatively be rate matched around the at least one reference signal associated with the second downlink control channel or the at least one physical channel. In other examples, the receiver of the apparatus including the wireless communication manager 715 may be used to receive the downlink control channel on resources of the first set of downlink control channel resources exclusive of the overlap, as described for example with reference to FIGS. 2-5.

The spatial processor 740 may be used to process the set of reference signals associated with the downlink control channel based at least in part on the determination of whether at least one reference signal associated with the second downlink control channel associated with the second set of downlink control channel resources is present in the overlap, as described for example with reference to FIGS. 2-5. For example, the set of reference signals associated with the downlink control channel may be spatially processed when it is determined that the at least one reference signal associated with the second downlink control channel is present in the overlap.

The demodulator 745 may be used to demodulate the downlink control channel based at least in part on the set of reference signals, as described for example with reference to FIGS. 2-5. Demodulator 745 may demodulate one or more downlink control channel candidates of the first search space within the resources of the first control resource set that overlap with the resources of the second control resource set based on the first set of reference signals, where the communicating with the base station is based on the demodulating. In some cases, the monitoring the first search space includes: demodulating one or more downlink control channel candidates of the first search space within the resources of the first control resource set that overlap with the resources of the second control resource set based on the first set of reference signals.

Search space monitor 750 may identify a first control resource set and a second control resource set, where resources of the first control resource set at least partially overlap with resources of the second control resource set, identify at least one physical channel transmitted on at least a portion of the first control resource set, where a downlink control channel is rate matched around the at least one physical channel, monitor a second search space of the second control resource set, where the monitoring the second search space includes rate-matching second downlink control channel resources of the second control resource set for the second search space independently of the first control resource set, communicate with a base station based on control information identified as a result of the monitoring of the first search space or the monitoring of the second search space, monitor a first search space of the first control resource set, where the monitoring the first search space includes rate-matching first downlink control channel resources of the first control resource set for the first search space independently of the second control resource set, identify a second control resource set, where resources of the first control resource set at least partially overlap with resources of the second control resource set, and where second locations for a second set of reference signals of the second control resource set are non-coincident with the first locations within the resources of the first control resource set that overlap with the resources of the second control resource set, monitor a first search space of the first control resource set, where the monitoring the first search space includes rate matching first downlink control channel resources of the first control resource set around the first locations and the second locations within the resources of the first control resource set that overlap with the resources of the second control resource set, communicate with a base station based on control information identified as a result of the monitoring the first search space, and identify a first control resource set configured for downlink control information for the UE, the first control resource set having first locations for a first set of reference signals. In some cases, the monitoring the first search space includes rate matching the first downlink control channel resources to the second locations within the resources of the first control resource set that overlap with the resources of the second control resource set. In some cases, the rate matching the first downlink control channel resources to the second locations is based on a type of the first control resource set and a type of the second control resource set. In some cases, the monitoring the first search space includes spatially processing the resources of the first control resource set that overlap with the resources of the second control resource set based on the first set of reference signals.

Figure 8:
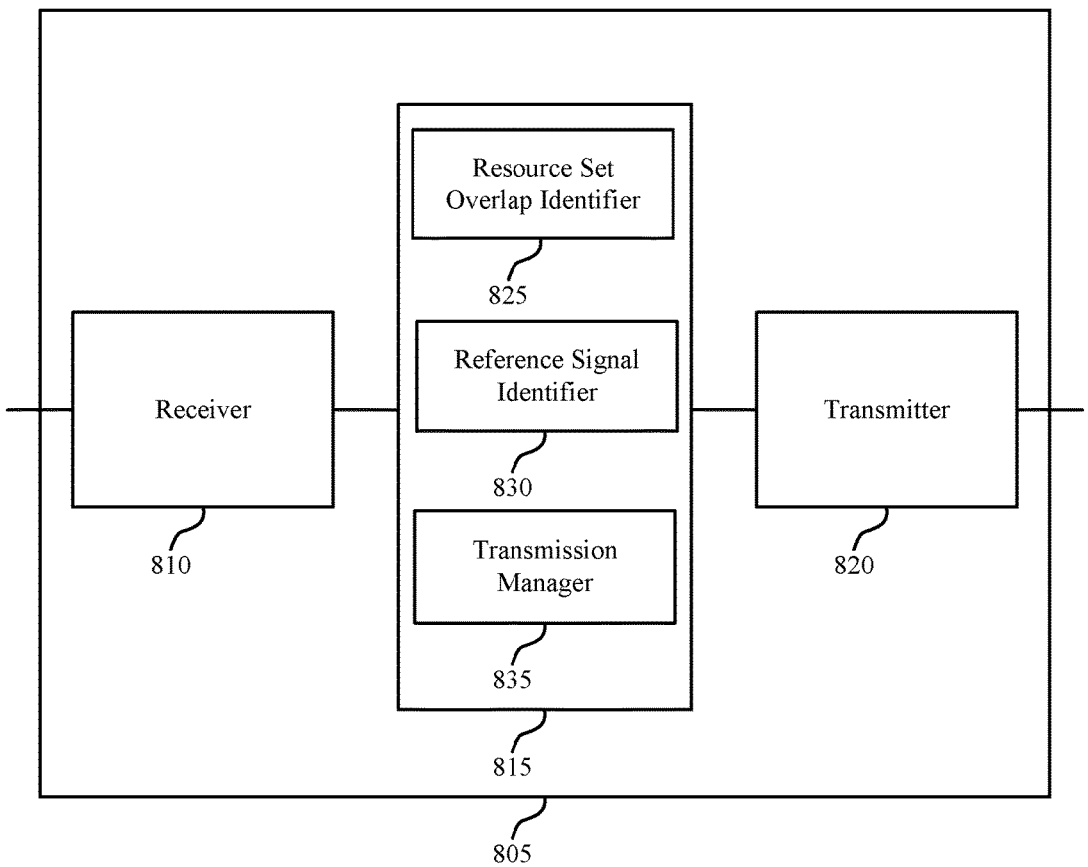
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the base stations described with reference to FIG. 1. The apparatus 805 may include a receiver 810, a wireless communication manager 815, and a transmitter 820. The apparatus 805 may also include a processor. Each of these components may be in communication with one another (e.g., via one or more buses).

The receiver 810 may receive data or control signals or information (i.e., transmissions), some or all of which may be associated with various information channels (e.g., data channels, control channels, etc.). Received signals or information, or measurements performed thereon, may be passed to other components of the apparatus 805.

The transmitter 820 may transmit data or control signals or information (i.e., transmissions) generated by other components of the apparatus 805, some or all of which may be associated with various information channels (e.g., data channels, control channels, etc.). In some examples, the transmitter 820 may be used to transmit a downlink control channel and associated set of reference signals. In some examples, the transmitter 820 may be collocated with the receiver 810 in a transceiver. For example, the transmitter 820 and receiver 810 may be an example of aspects of the transceiver(s) 1150 described with reference to FIG. 11.

The wireless communication manager 815 and/or at least some of its various sub-components may be implemented in hardware, software executed by a processor, firmware, or any combination thereof. If implemented in software executed by a processor, the functions of the wireless communication manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless communication manager 815 and/or at least some of its various sub-components may be physically located at various positions, including being distributed such that portions of functions are implemented at different physical locations by one or more physical devices. In some examples, the wireless communication manager 815 and/or at least some of its various sub-components may be a separate and distinct component in accordance with various aspects of the present disclosure. In other examples, the wireless communication manager 815 and/or at least some of its various sub-components may be combined with one or more other hardware components, including but not limited to an I/O component, a transceiver, another computing device, one or more other components described in the present disclosure, or a combination thereof, in accordance with various aspects of the present disclosure. The wireless communication manager 815 may include a resource set overlap identifier 825, a reference signal identifier 830, and a transmission manager 835.

The resource set overlap identifier 825 may be used to identify an overlap in resources between a first set of downlink control channel resources and a second set of downlink control channel resources, as described for example with reference to FIGS. 2-5. In some examples, the first set of downlink control channel resources may be a first search space within a downlink control resource set, and the second set of downlink control channel resources may be a second search space. In other examples, the first set of downlink control channel resources may be a first downlink control resource set and the second set of downlink control channel resources may be a second downlink control resource set (and in some of these examples, the first downlink control channel may be further included in a search space of the first downlink control resource set).

The reference signal identifier 830 may be used to identify, based at least in part on the overlap, a set of reference signals associated with a downlink control channel for transmission on the first set of downlink control channel resources, as described for example with reference to FIGS. 2-5.

The transmission manager 835 may be used to transmit the downlink control channel and the set of reference signals on the first set of downlink control channel resources, as described for example with reference to FIGS. 2-5. In some examples, the transmitting may include transmitting the downlink control channel on a subset of resources of the first search space. The subset of resources may be at least partially within the overlap.

Figure 9:
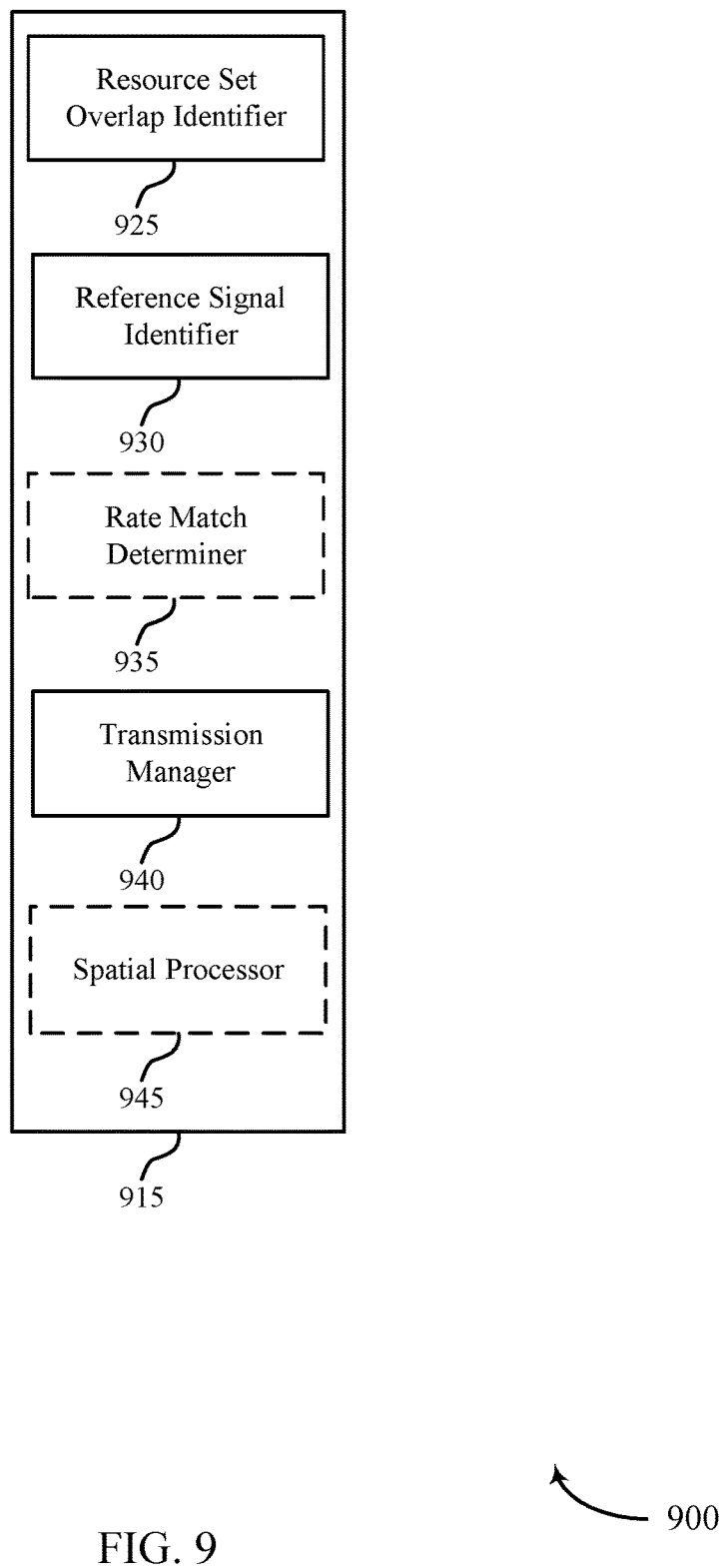
FIG. 9 shows a block diagram of a wireless communication manager, in accordance with various aspects of the present disclosure.

FIG. 9 shows a block diagram 900 of a wireless communication manager 915, in accordance with various aspects of the present disclosure. The wireless communication manager 915 may be an example of aspects of the wireless communication manager described with reference to FIG. 8. The wireless communication manager 915 may include a resource set overlap identifier 925, a reference signal identifier 930, an optional rate match determiner 935, a transmission manager 940, and an optional spatial processor 945. Each of these components may communicate, directly or indirectly, with one another (e.g., via one or more buses). The resource set overlap identifier 925, reference signal identifier 930, and transmission manager 940 may be examples of the resource set overlap identifier 825, reference signal identifier 830, and transmission manager 835 described with reference to FIG. 8.

The resource set overlap identifier 925 may be used to identify an overlap in resources between a first set of downlink control channel resources and a second set of downlink control channel resources, as described for example with reference to FIGS. 2-5. In some examples, the first set of downlink control channel resources may be a first search space within a downlink control resource set, and the second set of downlink control channel resources may be a second search space within the downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set).

The reference signal identifier 930 may be used to identify, based at least in part on the overlap, a set of reference signals associated with a downlink control channel for transmission on the first set of downlink control channel resources, as described for example with reference to FIGS. 2-5. In some examples, identifying the set of reference signals may include determining whether to transmit at least one reference signal in the set of reference signals in the overlap based at least in part on a type of the first set of downlink control channel resources.

The reference signal identifier 930 may also be used to determine whether to transmit at least one reference signal associated with a second downlink control channel associated with the second set of downlink control channel resources in the overlap based at least in part on a type of the first set of downlink control channel resources and a type of the second set of downlink control channel resources, as described for example with reference to FIGS. 2-5. In some examples, the at least one reference signal associated with the second downlink control channel may coincide with a reference signal of the set of reference signals associated with the downlink control channel.

The rate match determiner 935 may be used to rate matching the downlink control channel around the set of reference signals. The rate match determiner 935 may also be used to determine whether to rate match the downlink control channel around at least one reference signal associated with a second downlink control channel associated with the second set of downlink control channel resources based at least in part on the type of the first set of downlink control channel resources and the type of the second set of downlink control channel resources, and when applicable, to rate match the downlink control channel around the at least one reference signal associated with the second downlink control channel. The rate match determiner 935 may also be used to identify at least one physical channel transmitted on at least a portion of the first set of downlink control channel resources, and when applicable, to rate match the downlink control channel around the at least one physical channel.

The transmission manager 940 may be used to transmit the downlink control channel and the set of reference signals on the first set of downlink control channel resources, as described for example with reference to FIGS. 2-5. In some examples, at least a portion of the downlink control channel may be transmitted on resources of the first set of downlink control channel resources within the overlap. In some of these examples, the transmitting may include using the spatial processor 945 to spatially process the set of reference signals associated with the downlink control channel based at least in part on the determination of whether to transmit at least one reference signal associated with a second downlink control channel associated with the second set of downlink control channel resources in the overlap. For example, the set of reference signals associated with the downlink control channel may be spatially processed when it is determined that the at least one reference signal associated with the second downlink control channel to be transmitted in the overlap. In other examples, the downlink control channel may be transmitted on resources of the first set of downlink control channel resources exclusive of the overlap. In some examples, the transmitting may include transmitting the downlink control channel on a subset of resources of the first search space.

Figure 10:
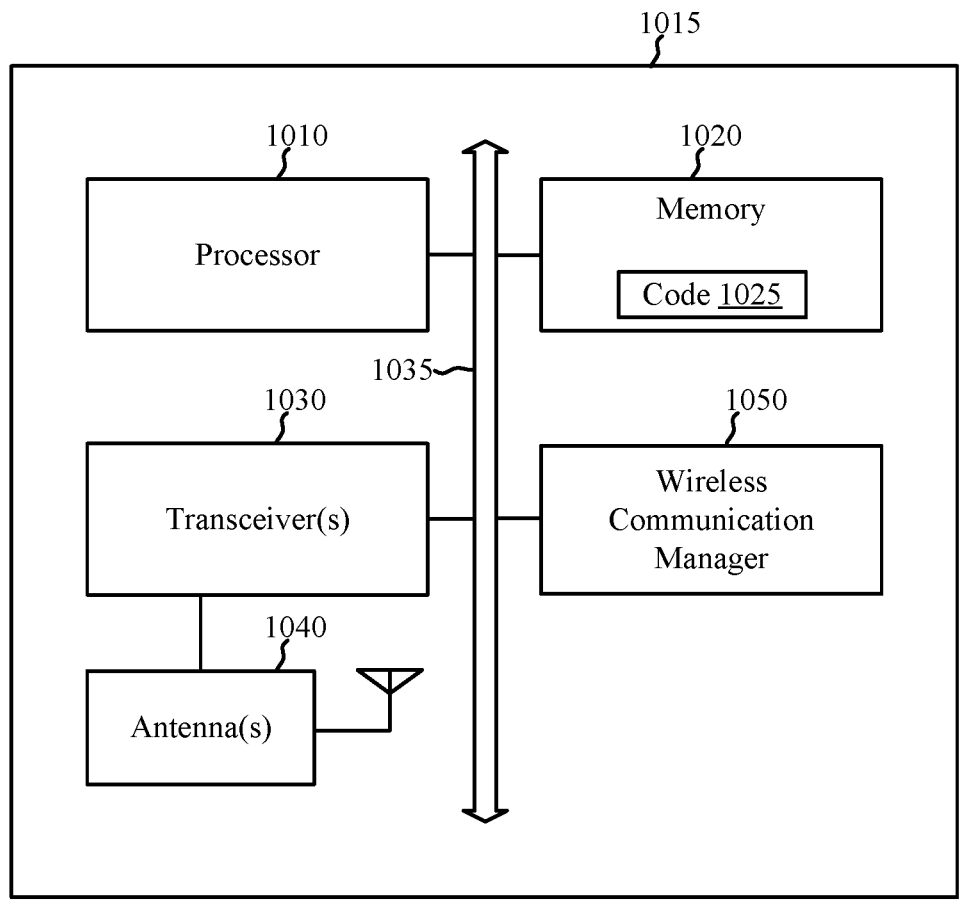
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1015 may, in some examples, have an internal power supply (not shown), such as a small battery, to facilitate mobile operation. In some examples, the UE 1015 may be an example of aspects of one or more of the UEs described with reference to FIG. 1, or aspects of the apparatus described with reference to FIG. 6. The UE 1015 may be configured to implement at least some of the UE or apparatus techniques or functions described with reference to FIGS. 1-7.

The UE 1015 may include a processor 1010, a memory 1020, at least one transceiver (represented by transceiver(s) 1030), antennas 1040 (e.g., an antenna array), or a wireless communication manager 1050. Each of these components may be in communication with each other, directly or indirectly, over one or more buses 1035.

The memory 1020 may include random access memory (RAM) or read-only memory (ROM). The memory 1020 may store computer-readable, computer-executable code 1025 containing instructions that are configured to, when executed, cause the processor 1010 to perform various functions described herein related to wireless communication, including, for example, determining whether reference signals for demodulation of a downlink control channel are present within a region of overlap between different downlink control resource sets or different search spaces of a same downlink control resource set. Alternatively, the computer-executable code 1025 may not be directly executable by the processor 1010 but be configured to cause the UE 1015 (e.g., when compiled and executed) to perform various of the functions described herein.

The processor 1010 may include an intelligent hardware device, e.g., a central processing unit (CPU), a microcontroller, an ASIC, etc. The processor 1010 may process information received through the transceiver(s) 1030 or information to be sent to the transceiver(s) 1030 for transmission through the antennas 1040. The processor 1010 may handle, alone or in connection with the wireless communication manager 1050, one or more aspects of communicating over (or managing communications over) one or more radio frequency spectrum bands.

The transceiver(s) 1030 may include a modem configured to modulate packets and provide the modulated packets to the antennas 1040 for transmission, and to demodulate packets received from the antennas 1040. The transceiver(s) 1030 may, in some examples, be implemented as one or more transmitters and one or more separate receivers. The transceiver(s) 1030 may support communications in one or more radio frequency spectrum bands. The transceiver(s) 1030 may be configured to communicate bi-directionally, via the antennas 1040, with one or more base stations or apparatuses, such as one or more of the base stations or apparatuses described with reference to FIGS. 1 and 8.

The wireless communication manager 1050 may be configured to perform or control some or all of the UE or apparatus techniques or functions described with reference to FIGS. 1-7. The wireless communication manager 1050, or portions of it, may include a processor, or some or all of the functions of the wireless communication manager 1050 may be performed by the processor 1010 or in connection with the processor 1010. In some examples, the wireless communication manager 1050 may be an example of aspects of one or more of the wireless communication managers described with reference to FIGS. 6 and 7.

Figure 11:
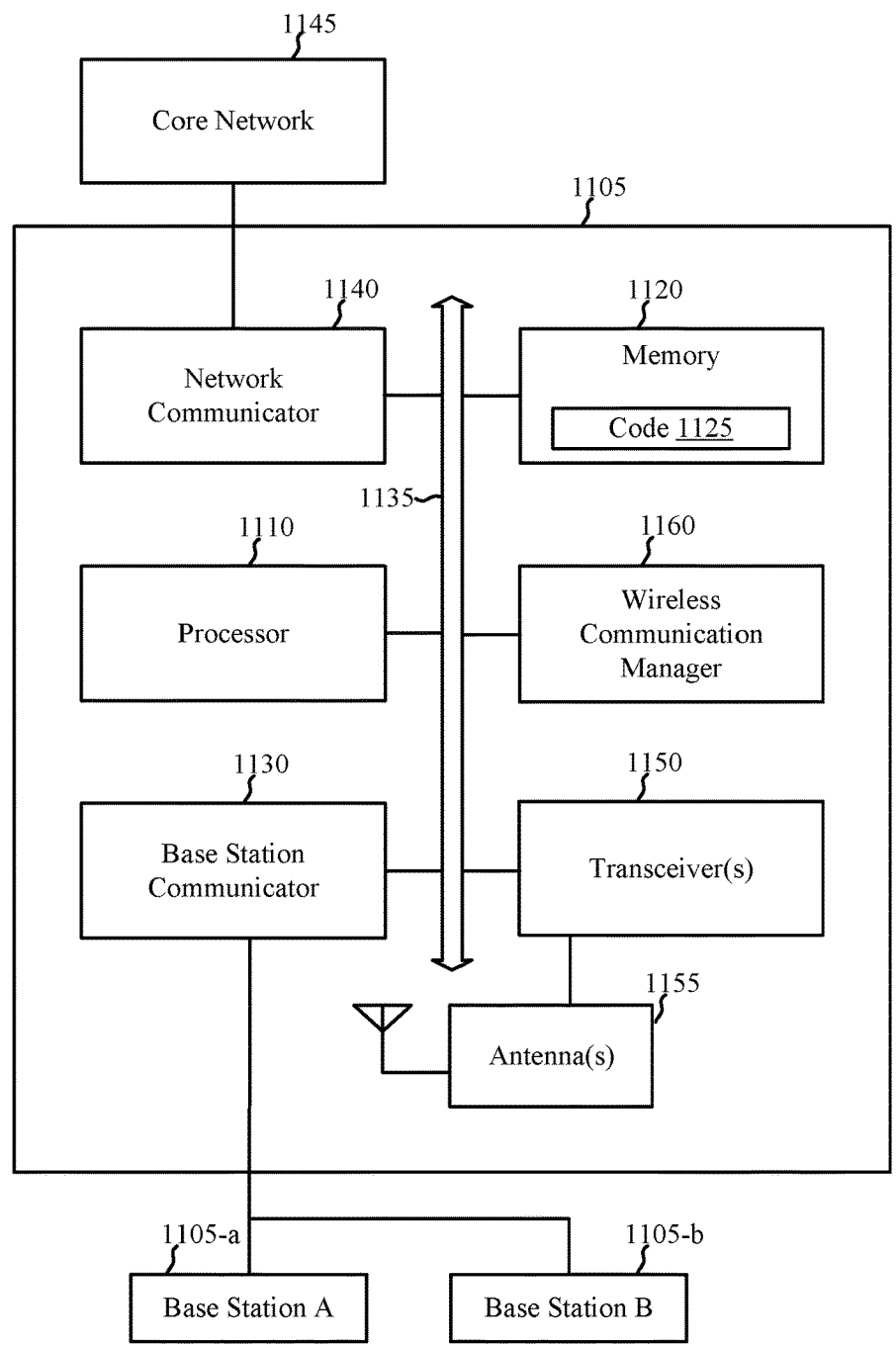
FIG. 11 shows a block diagram of a base station for use in wireless communication, in accordance with various aspects of the present disclosure.

FIG. 11 shows a block diagram 1100 of a base station 1105 for use in wireless communication, in accordance with various aspects of the present disclosure. In some examples, the base station 1105 may be an example of aspects of one or more of the base stations described with reference to FIG. 1, or aspects of the apparatus described with reference to FIG. 8. The base station 1105 may be configured to implement or facilitate at least some of the base station or apparatus techniques or functions described with reference to FIGS. 1-5, 8, and 9.

The base station 1105 may include a processor 1110, a memory 1120, at least one transceiver (represented by transceiver(s) 1150), at least one antenna 1155 (e.g., an antenna array), or a wireless communication manager 1160. The base station 1105 may also include one or more of a base station communicator 1130 or a network communicator 1140. Each of these components may be in communication with each other, directly or indirectly, over one or more buses 1135.

The memory 1120 may include RAM or ROM. The memory 1120 may store computer-readable, computer-executable code 1125 containing instructions that are configured to, when executed, cause the processor 1110 to perform various functions described herein related to wireless communication, including, for example, determining whether to transmit reference signals for a downlink control channel, which reference signals are within a region of overlap between different downlink control resource sets or different search spaces of a same downlink control resource set. Alternatively, the computer-executable code 1125 may not be directly executable by the processor 1110 but be configured to cause the base station 1105 (e.g., when compiled and executed) to perform various of the functions described herein.

The processor 1110 may include an intelligent hardware device, e.g., a CPU, a microcontroller, an ASIC, etc. The processor 1110 may process information received through the transceiver(s) 1150, the base station communicator 1130, or the network communicator 1140. The processor 1110 may also process information to be sent to the transceiver(s) 1150 for transmission through the antennas 1155, or to the base station communicator 1130 for transmission to one or more other base stations (e.g., base station 1105-a and base station 1105-b), or to the network communicator 1140 for transmission to a core network 1145, which may be an example of one or more aspects of the core network 130 described with reference to FIG. 1. The processor 1110 may handle, alone or in connection with the wireless communication manager 1160, one or more aspects of communicating over (or managing communications over) one or more radio frequency spectrum bands.

The transceiver(s) 1150 may include a modem configured to modulate packets and provide the modulated packets to the antennas 1155 for transmission, and to demodulate packets received from the antennas 1155. The transceiver(s) 1150 may, in some examples, be implemented as one or more transmitters and one or more separate receivers. The transceiver(s) 1150 may support communications in one or more radio frequency spectrum bands. The transceiver(s) 1150 may be configured to communicate bi-directionally, via the antennas 1155, with one or more UEs or apparatuses, such as one or more of the UEs or apparatus described with reference to FIGS. 1, 6, and 9. The base station 1105 may communicate with the core network 1145 through the network communicator 1140. The base station 1105 may also communicate with other base stations, such as the base station 1105-a and the base station 1105-b, using the base station communicator 1130.

The wireless communication manager 1160 may be configured to perform or control some or all of the base station or apparatus techniques or functions described with reference to FIGS. 1-5, 8, and 9. The wireless communication manager 1160, or portions of it, may include a processor, or some or all of the functions of the wireless communication manager 1160 may be performed by the processor 1110 or in connection with the processor 1110. In some examples, the wireless communication manager 1160 may be an example of aspects of one or more of the wireless communication managers described with reference to FIGS. 8 and 9.

Figure 12:
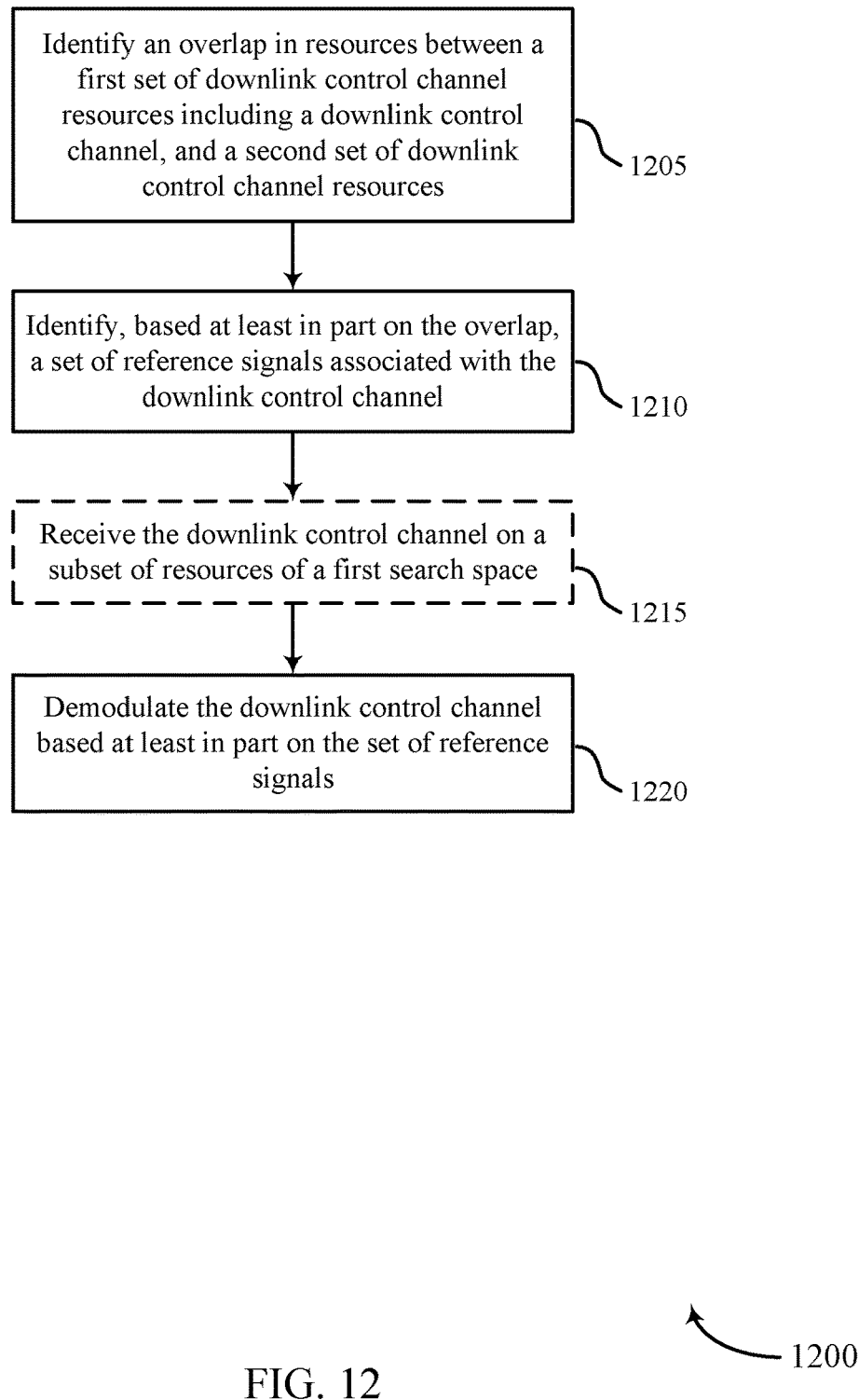
FIGS. 12-14 are flow charts illustrating examples of methods for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to aspects of one or more of the UEs described with reference to FIGS. 1 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include identifying an overlap in resources between a first set of downlink control channel resources including a downlink control channel, and a second set of downlink control channel resources, as described for example with reference to FIGS. 2-5. In some examples, the first set of downlink control channel resources may be a first search space within a first downlink control resource set, and the second set of downlink control channel resources may be a second search space within the first downlink control resource set or a second downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set). In some examples, the operation(s) at block 1205 may be performed using the resource set overlap identifier described with reference to FIGS. 6 and 7.

At block 1210, the method 1200 may include identifying, based at least in part on the overlap, a set of reference signals associated with the downlink control channel, as described for example with reference to FIGS. 2-5. In some examples, the operation(s) at block 1210 may be performed using the reference signal identifier described with reference to FIGS. 6 and 7.

At block 1215, the method 1200 may optionally include receiving the downlink control channel on a subset of resources of the first search space (e.g., when the identified overlap is between the first search space and the second search space), as described for example with reference to FIGS. 2-5. In some examples, the operation(s) at block 1215 may be performed using the receiver described with reference to FIG. 6.

At block 1220, the method 1200 may include demodulating the downlink control channel based at least in part on the set of reference signals, as described for example with reference to FIGS. 2-5. In some examples, the operation(s) at block 1220 may be performed using the demodulator described with reference to FIGS. 6 and 7.

Figure 13:
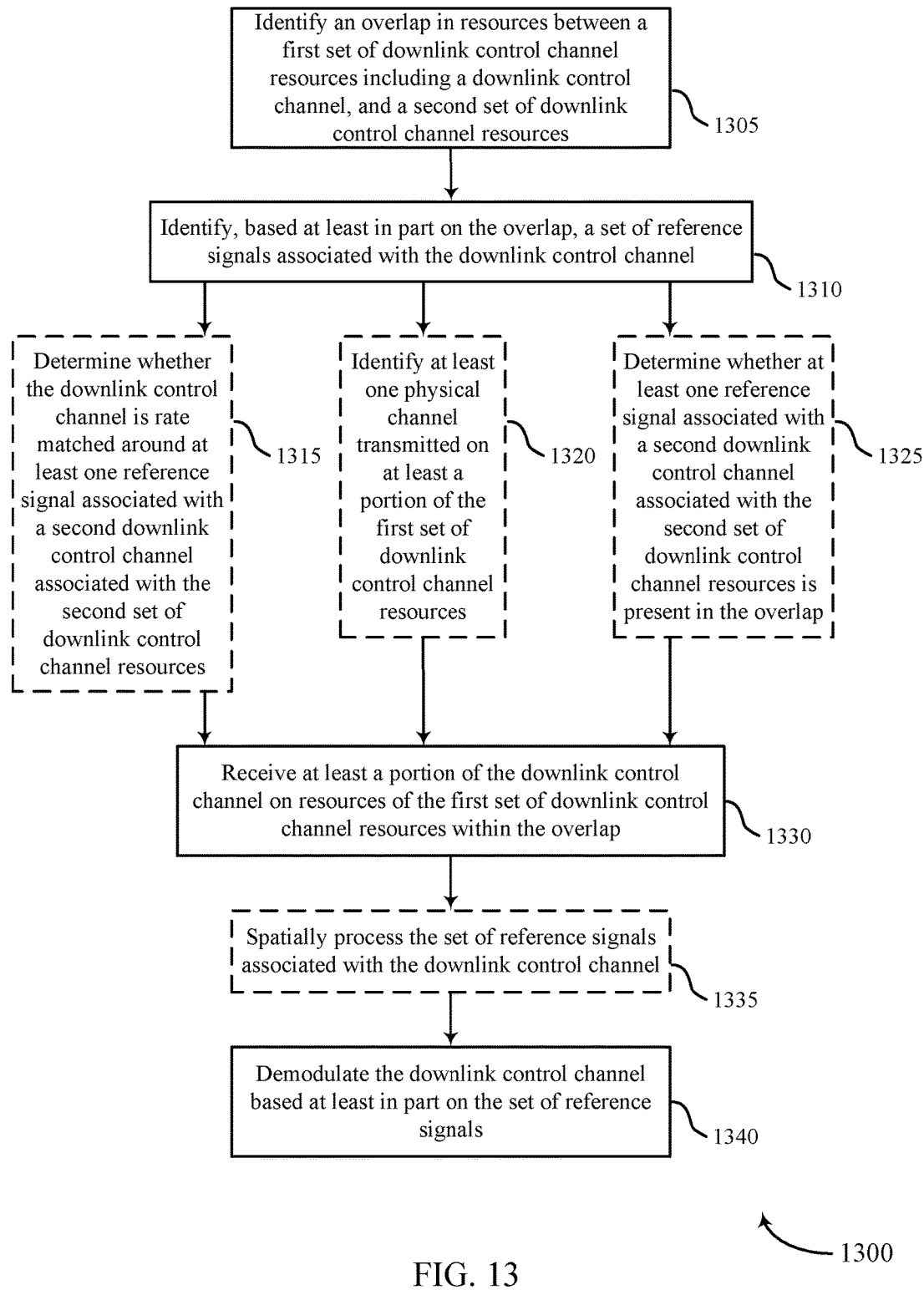

FIG. 13 is a flow chart illustrating an example of a method 1300 for wireless communication at a UE, in accordance with various aspects of the present disclosure. For clarity, the method 1300 is described below with reference to aspects of one or more of the UEs described with reference to FIGS. 1 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include identifying an overlap in resources between a first set of downlink control channel resources including a downlink control channel, and a second set of downlink control channel resources, as described for example with reference to FIGS. 2-5. In some examples, the first set of downlink control channel resources may be a first search space within a downlink control resource set, and the second set of downlink control channel resources may be a second search space within the first downlink control resource set or a second downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set). In some examples, the operation(s) at block 1305 may be performed using the resource set overlap identifier described with reference to FIGS. 6 and 7.

At block 1310, the method 1300 may include identifying, based at least in part on the overlap, a set of reference signals associated with the downlink control channel, as described for example with reference to FIGS. 2-5. In some examples, the operation(s) at block 1310 may be performed using the reference signal identifier described with reference to FIGS. 6 and 7.

The method 1300 may optionally include the operation(s) at one or more of blocks 1315, 1320, or 1325. At block 1315, the method 1300 may optionally include determining whether the downlink control channel is rate matched around at least one reference signal associated with a second downlink control channel associated with the second set of downlink control channel resources, as described for example with reference to FIGS. 2-5. The determination may be based at least in part on a type of the first set of downlink control channel resources and a type of the second set of downlink control channel resources. In some examples, the operation(s) at block 1315 may be performed using the rate match determiner described with reference to FIG. 7.

At block 1320, the method 1300 may optionally include identifying at least one physical channel transmitted on at least a portion of the first set of downlink control channel resources, as described for example with reference to FIGS. 2-5. In some examples, the operation(s) at block 1320 may be performed using the rate match determiner described with reference to FIG. 7.

At block 1325, the method 1300 may optionally include determining whether at least one reference signal associated with the second downlink control channel associated with the second set of downlink control channel resources is present in the overlap, as described for example with reference to FIGS. 2-5. The determination may be based at least in part on the type of the first set of downlink control channel resources and the type of the second set of downlink control channel resources. In some examples, the at least one reference signal associated with the second downlink control channel may coincide with a reference signal of the set of reference signals associated with the downlink control channel. In some examples, the operation(s) at block 1325 may be performed using the reference signal identifier described with reference to FIGS. 6 and 7.

At block 1330, the method 1300 may include receiving at least a portion of the downlink control channel on resources of the first set of downlink control channel resources within the overlap, as described for example with reference to FIGS. 2-5. In some examples, the downlink control channel may be rate matched around the set of reference signals. The downlink control channel may also or alternatively be rate matched around the at least one reference signal associated with the second downlink control channel or the at least one physical channel. In some examples, the operation(s) at block 1330 may be performed using the receiver described with reference to FIG. 6.

At block 1335, and when the method includes the operations at block 1325, the method 1300 may optionally include spatially processing the set of reference signals associated with the downlink control channel based at least in part on the determination made at block 1325, as described for example with reference to FIGS. 2-5. For example, the set of reference signals associated with the downlink control channel may be spatially processed when it is determined that the at least one reference signal associated with the second downlink control channel is present in the overlap. In some examples, the operation(s) at block 1335 may be performed using the spatial processor described with reference to FIG. 7.

At block 1340, the method 1300 may include demodulating the downlink control channel based at least in part on the set of reference signals, as described for example with reference to FIGS. 2-5. In some examples, the operation(s) at block 1340 may be performed using the demodulator described with reference to FIGS. 6 and 7.

Figure 14:
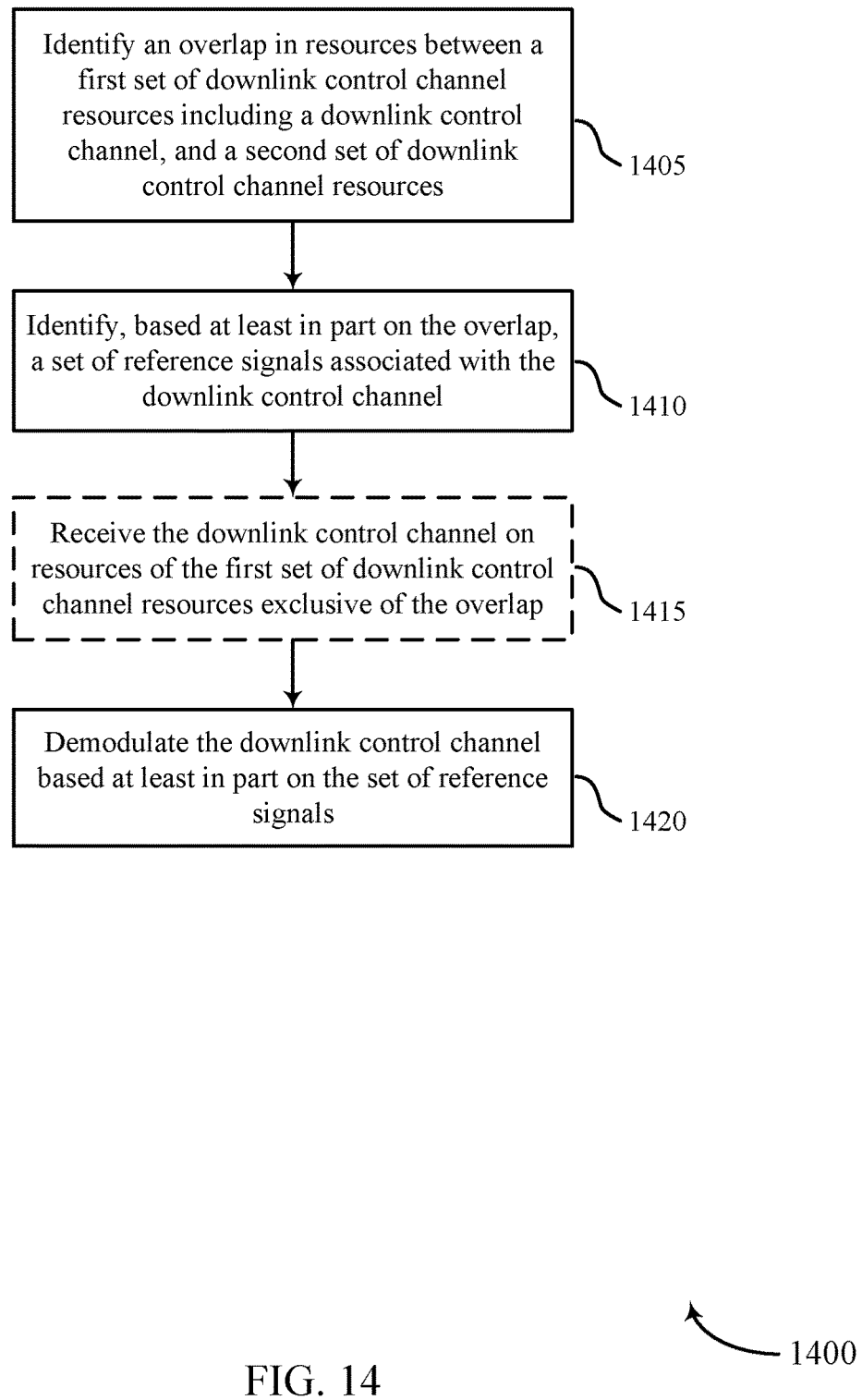

FIG. 14 is a flow chart illustrating an example of a method 1400 for wireless communication at a UE, in accordance with various aspects of the present disclosure. For clarity, the method 1400 is described below with reference to aspects of one or more of the UEs described with reference to FIGS. 1 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include identifying an overlap in resources between a first set of downlink control channel resources including a downlink control channel, and a second set of downlink control channel resources, as described for example with reference to FIGS. 2-5. In some examples, the first set of downlink control channel resources may be a first search space within a first downlink control resource set, and the second set of downlink control channel resources may be a second search space within the first downlink control resource set or a second downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set). In some examples, the operation(s) at block 1405 may be performed using the resource set overlap identifier described with reference to FIGS. 6 and 7.

At block 1410, the method 1400 may include identifying, based at least in part on the overlap, a set of reference signals associated with the downlink control channel, as described for example with reference to FIGS. 2-5. In some examples, identifying the set of reference signals may include determining whether at least one reference signal in the set of reference signals is located in the overlap based at least in part on a type of the first set of downlink control channel resources. In some examples, the operation(s) at block 1410 may be performed using the reference signal identifier described with reference to FIGS. 6 and 7.

At block 1415, the method 1400 may include receiving the downlink control channel on resources of the first set of downlink control channel resources exclusive of the overlap, as described for example with reference to FIGS. 2-5. In some examples, the operation(s) at block 1415 may be performed using the receiver described with reference to FIG. 6.

At block 1420, the method 1400 may include demodulating the downlink control channel based at least in part on the set of reference signals, as described for example with reference to FIGS. 2-5. In some examples, the operation(s) at block 1420 may be performed using the demodulator described with reference to FIGS. 6 and 7.

Figure 15:
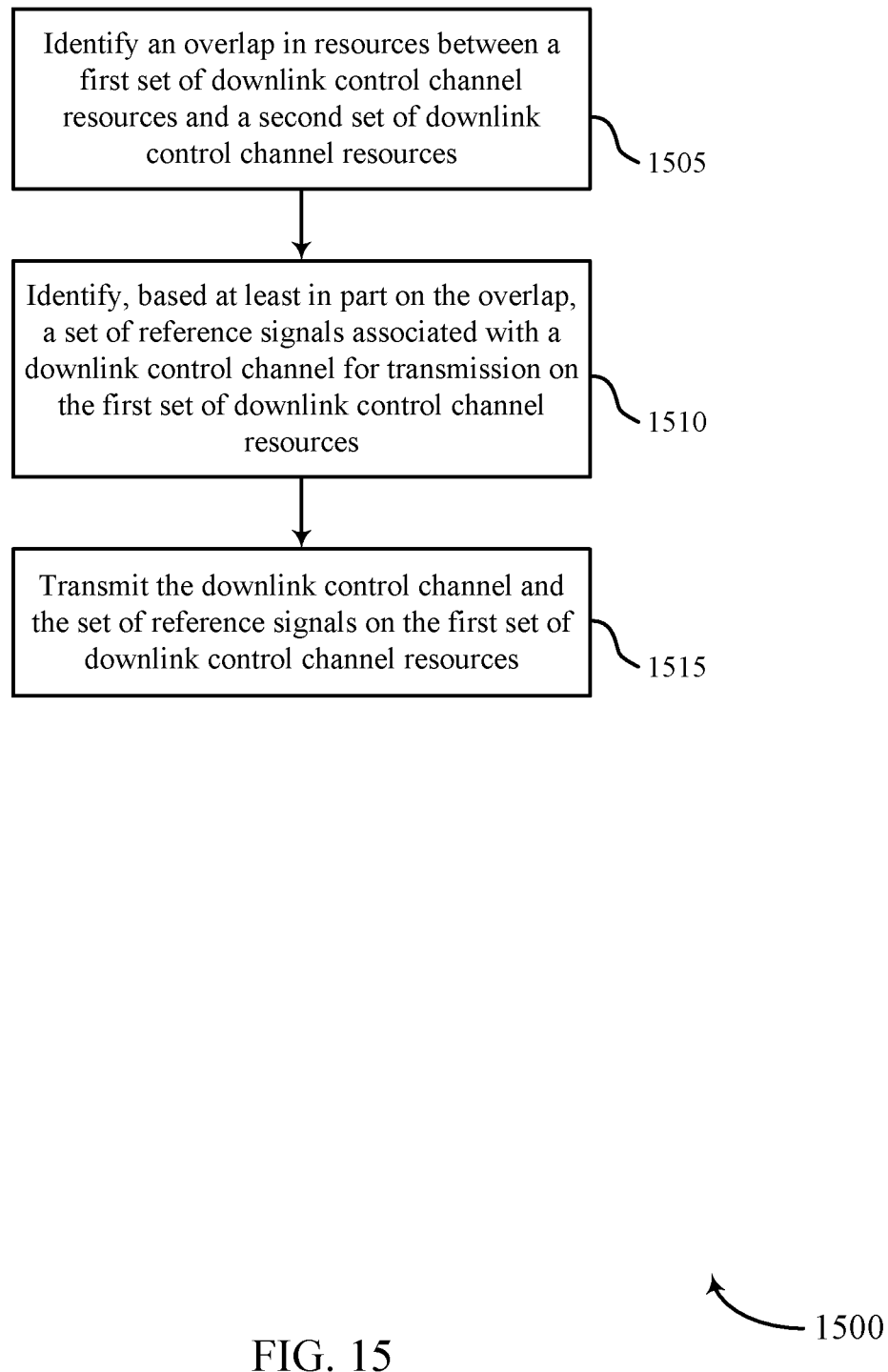
FIGS. 15-20 are flow charts illustrating examples of methods for wireless communication at a base station, in accordance with various aspects of the present disclosure.

FIG. 15 is a flow chart illustrating an example of a method 1500 for wireless communication at a base station, in accordance with various aspects of the present disclosure. For clarity, the method 1500 is described below with reference to aspects of one or more of the base stations described with reference to FIGS. 1 and 11, aspects of the apparatus described with reference to FIG. 8, or aspects of one or more of the wireless communication managers described with reference to FIGS. 8, 9, and 11. In some examples, a base station may execute one or more sets of codes to control the functional elements of the base station to perform the functions described below. Additionally or alternatively, the base station may perform one or more of the functions described below using special-purpose hardware.

At block 1505, the method 1500 may include identifying an overlap in resources between a first set of downlink control channel resources and a second set of downlink control channel resources, as described for example with reference to FIGS. 2-5. In some examples, the first set of downlink control channel resources may be a first search space within a first downlink control resource set, and the second set of downlink control channel resources may be a second search space within the first downlink control resource set or a second downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set). In some examples, the operation(s) at block 1505 may be performed using the resource set overlap identifier described with reference to FIGS. 8 and 9.

At block 1510, the method 1500 may include identifying, based at least in part on the overlap, a set of reference signals associated with a downlink control channel for transmission on the first set of downlink control channel resources, as described for example with reference to FIGS. 2-5. In some examples, the operation(s) at block 1510 may be performed using the reference signal identifier described with reference to FIGS. 8 and 9.

At block 1515, the method 1500 may include transmitting the downlink control channel and the set of reference signals on the first set of downlink control channel resources, as described for example with reference to FIGS. 2-5. In some examples, the transmitting may include transmitting the downlink control channel on a subset of resources of the first search space. In some examples, the operation(s) at block 1515 may be performed using the transmission manager described with reference to FIGS. 8 and 9.

Figure 16:
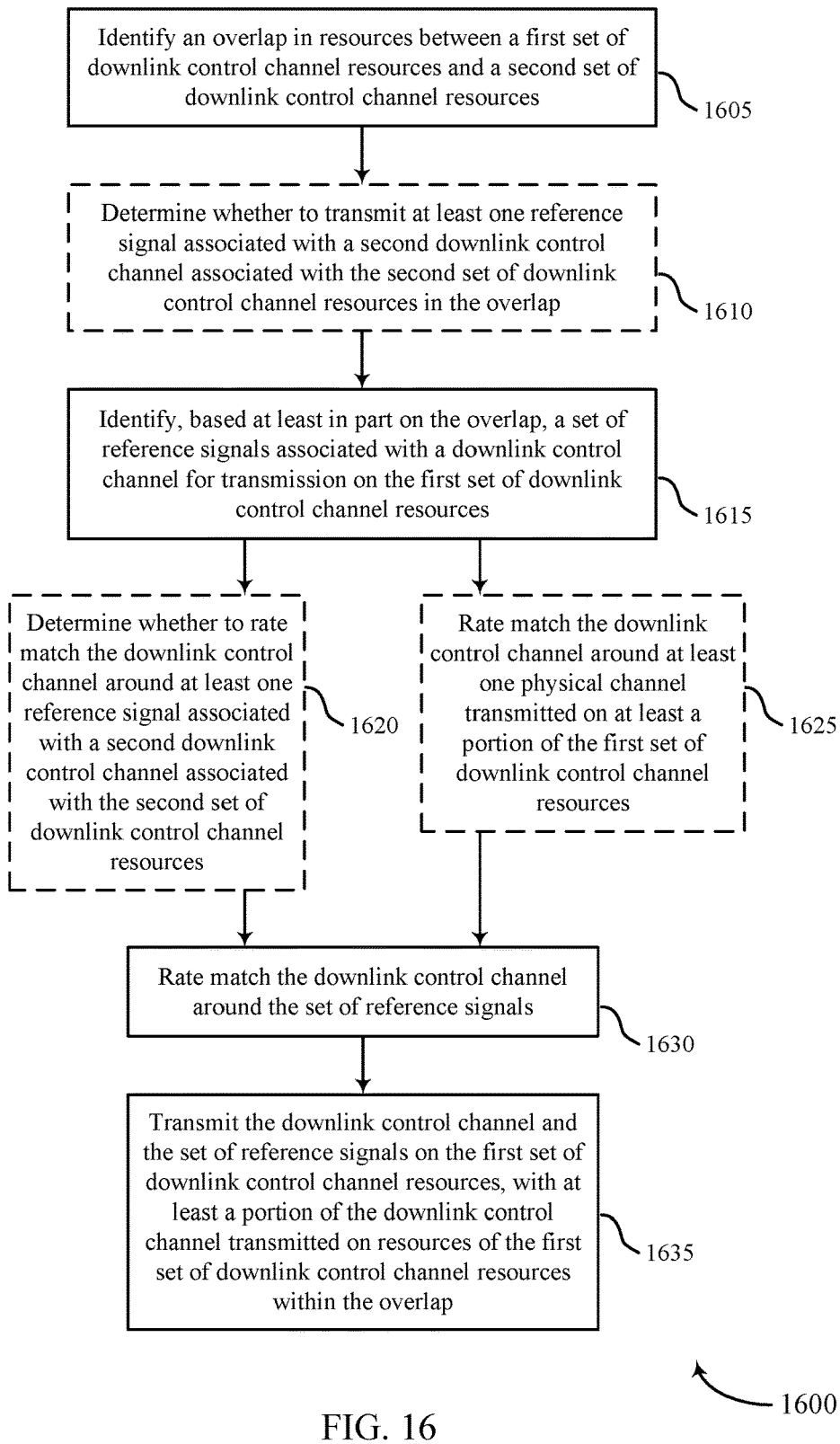

FIG. 16 is a flow chart illustrating an example of a method 1600 for wireless communication at a base station, in accordance with various aspects of the present disclosure. For clarity, the method 1600 is described below with reference to aspects of one or more of the base stations described with reference to FIGS. 1 and 11, aspects of the apparatus described with reference to FIG. 8, or aspects of one or more of the wireless communication managers described with reference to FIGS. 8, 9, and 11. In some examples, a base station may execute one or more sets of codes to control the functional elements of the base station to perform the functions described below. Additionally or alternatively, the base station may perform one or more of the functions described below using special-purpose hardware.

At block 1605, the method 1600 may include identifying an overlap in resources between a first set of downlink control channel resources and a second set of downlink control channel resources, as described for example with reference to FIGS. 2-5. In some examples, the first set of downlink control channel resources may be a first search space within a first downlink control resource set, and the second set of downlink control channel resources may be a second search space within the first downlink control resource set or a second downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set). In some examples, the operation(s) at block 1605 may be performed using the resource set overlap identifier described with reference to FIGS. 8 and 9.

At block 1610, the method 1600 may optionally include determining whether to transmit at least one reference signal associated with a second downlink control channel associated with the second set of downlink control channel resources in the overlap based at least in part on a type of the first set of downlink control channel resources and a type of the second set of downlink control channel resources, as described for example with reference to FIGS. 2-5. In some examples, the at least one reference signal associated with the second downlink control channel may coincide with a reference signal of the set of reference signals associated with the downlink control channel. In some examples, the operation(s) at block 1610 may be performed using the reference signal identifier described with reference to FIGS. 8 and 9.

At block 1615, the method 1600 may include identifying, based at least in part on the overlap, a set of reference signals associated with a downlink control channel for transmission on the first set of downlink control channel resources, as described for example with reference to FIGS. 2-5. In some examples, the operation(s) at block 1615 may be performed using reference signal identifier described with reference to FIGS. 8 and 9.

The method 1600 may optionally include the operation(s) at one or more of blocks 1620 or 1625. At block 1620, the method 1600 may optionally include determining whether to rate match the downlink control channel around at least one reference signal associated with a second downlink control channel associated with the second set of downlink control channel resources based at least in part on the type of the first set of downlink control channel resources and the type of the second set of downlink control channel resources. In some examples, the operation(s) at block 1620 may be performed using rate match determiner described with reference to FIG. 9.

At block 1625, the method 1600 may optionally include identifying at least one physical channel transmitted on at least a portion of the first set of downlink control channel resources. In some examples, the operation(s) at block 1625 may be performed using rate match determiner described with reference to FIG. 9.

At block 1630, the method 1600 may include rate matching the downlink control channel around the set of reference signals. In some examples, the method 1600 may also include rate matching the downlink control channel around the at least one reference signal associated with the second downlink control channel or the at least one physical channel. In some examples, the operation(s) at block 1630 may be performed using rate match determiner described with reference to FIG. 9.

At block 1635, the method 1600 may include transmitting the downlink control channel and the set of reference signals on the first set of downlink control channel resources, as described for example with reference to FIGS. 2-5. At least a portion of the downlink control channel may be transmitted on resources of the first set of downlink control channel resources within the overlap. In some examples, the transmitting may include spatially processing the set of reference signals associated with the downlink control channel based at least in part on the determination made at block 1610. For example, the set of reference signals associated with the downlink control channel may be spatially processed when it is determined that the at least one reference signal associated with the second downlink control channel to be transmitted in the overlap. In some examples, the transmitting may include transmitting the downlink control channel on a subset of resources of the first search space. In some examples, the operation(s) at block 1635 may be performed using the transmission manager described with reference to FIGS. 8 and 9.

Figure 17:
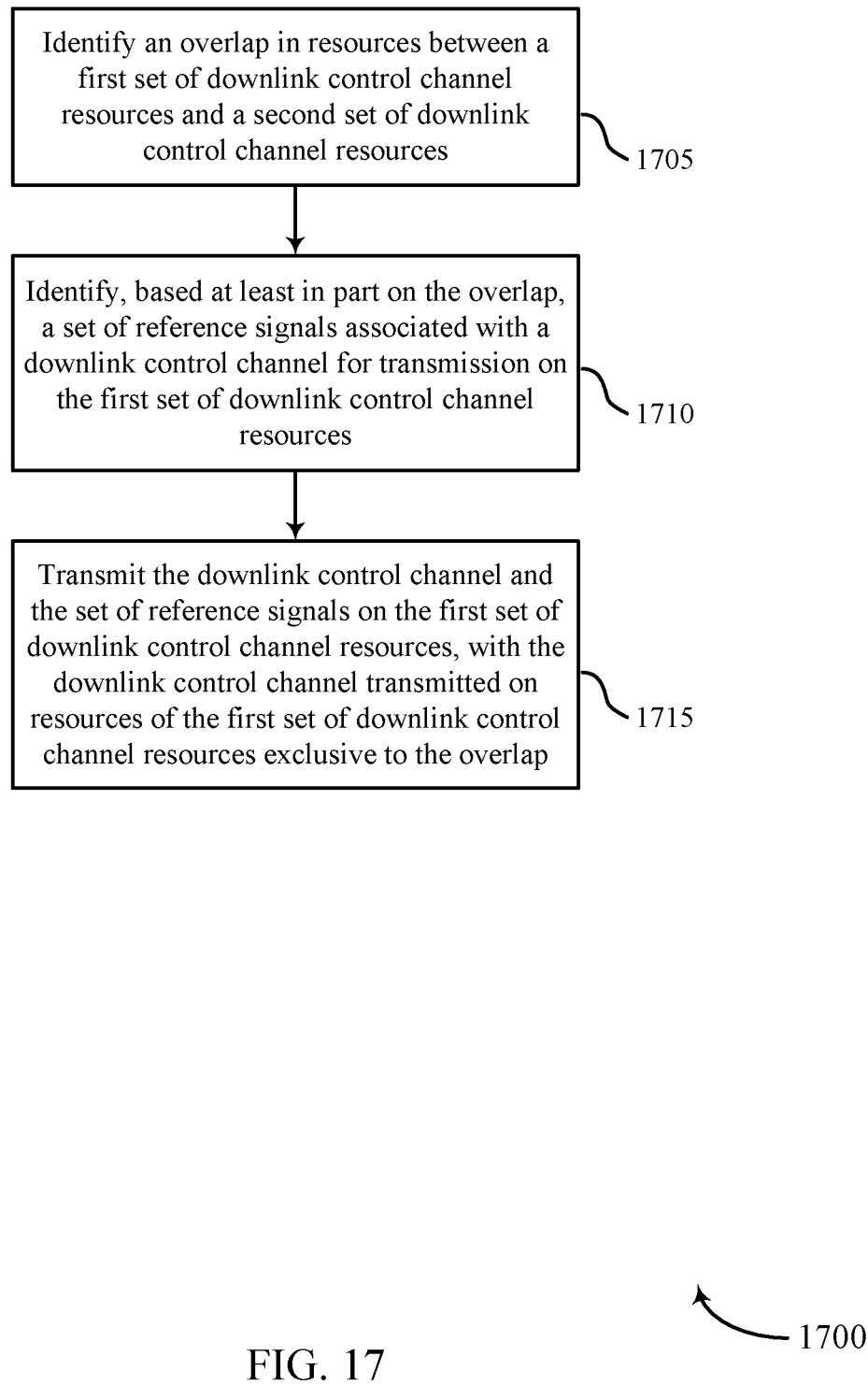

FIG. 17 is a flow chart illustrating an example of a method 1700 for wireless communication at a base station, in accordance with various aspects of the present disclosure. For clarity, the method 1700 is described below with reference to aspects of one or more of the base stations described with reference to FIGS. 1 and 11, aspects of the apparatus described with reference to FIG. 8, or aspects of one or more of the wireless communication managers described with reference to FIGS. 8, 9, and 11. In some examples, a base station may execute one or more sets of codes to control the functional elements of the base station to perform the functions described below. Additionally or alternatively, the base station may perform one or more of the functions described below using special-purpose hardware.

At block 1705, the method 1700 may include identifying an overlap in resources between a first set of downlink control channel resources and a second set of downlink control channel resources, as described for example with reference to FIGS. 2-5. In some examples, the first set of downlink control channel resources may be a first search space within a downlink control resource set, and the second set of downlink control channel resources may be a second search space within the downlink control resource set. In other examples, the first set of downlink control channel resources may be a first downlink control resource set and the second set of downlink control channel resources may be a second downlink control resource set (and in some of these examples, the first downlink control channel may be further included in a search space of the first downlink control resource set). In some examples, the operation(s) at block 1705 may be performed using the resource set overlap identifier described with reference to FIGS. 8 and 9.

At block 1710, the method 1700 may include identifying, based at least in part on the overlap, a set of reference signals associated with a downlink control channel for transmission on the first set of downlink control channel resources, as described for example with reference to FIGS. 2-5. In some examples, identifying the set of reference signals may include determining whether to transmit at least one reference signal in the set of reference signals in the overlap based at least in part on a type of the first set of downlink control channel resources. In some examples, the operation(s) at block 1710 may be performed using reference signal identifier described with reference to FIGS. 8 and 9.

At block 1715, the method 1700 may include transmitting the downlink control channel and the set of reference signals on the first set of downlink control channel resources, as described for example with reference to FIGS. 2-5. The downlink control channel may be transmitted on resources of the first set of downlink control channel resources exclusive of the overlap. In some examples, the transmitting may include transmitting the downlink control channel on a subset of resources of the first search space. In some examples, the operation(s) at block 1715 may be performed using the transmission manager described with reference to FIGS. 8 and 9.

Figure 18:
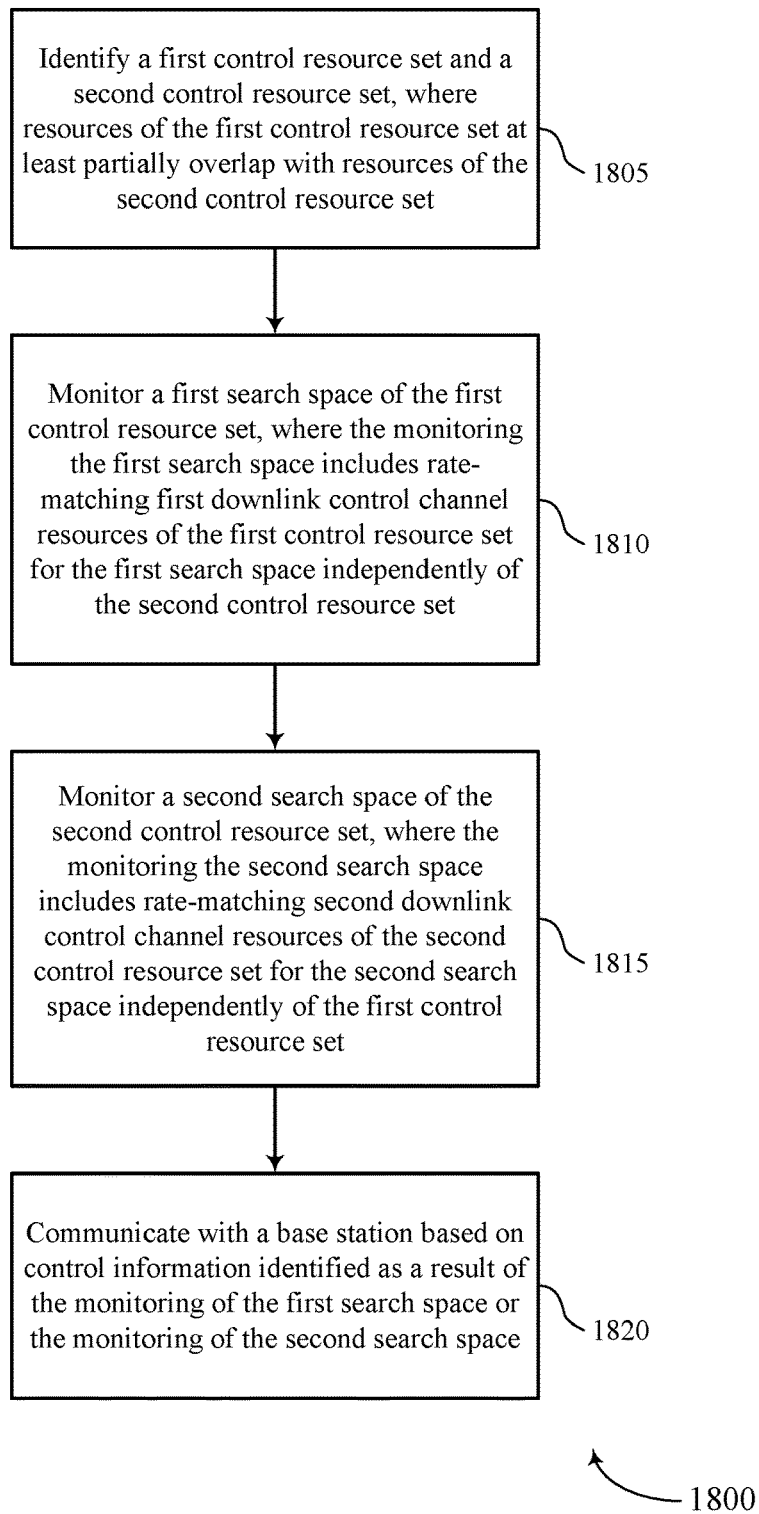

FIG. 18 shows a flowchart illustrating a method 1800 for techniques for handling overlapping sets of downlink control channel resources in accordance with aspects of the present disclosure. The operations of method 1800 may be implemented by a UE 115 or its components as described herein. For clarity, the method 1800 is described below with reference to aspects of one or more of the UEs described with reference to FIGS. 1 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include identifying a first control resource set and a second control resource set, wherein resources of the first control resource set at least partially overlap with resources of the second control resource set, as described for example with reference to FIGS. 2-5. The operations of 1805 may be performed according to the methods described herein. In certain examples, aspects of the operations of 1805 may be performed by a search space monitor as described with reference to FIGS. 6 and 7.

At block 1810, the method 1800 may include monitoring a first search space of the first control resource set, wherein the monitoring the first search space comprises rate-matching first downlink control channel resources of the first control resource set for the first search space independently of the second control resource set, as described for example with reference to FIGS. 2-5. The operations of 1810 may be performed according to the methods described herein. In certain examples, aspects of the operations of 1810 may be performed by a search space monitor as described with reference to FIGS. 6 and 7.

At block 1815, the method 1800 may include monitoring a second search space of the second control resource set, wherein the monitoring the second search space comprises rate-matching second downlink control channel resources of the second control resource set for the second search space independently of the first control resource set, as described for example with reference to FIGS. 2-5. The operations of 1815 may be performed according to the methods described herein. In certain examples, aspects of the operations of 1815 may be performed by a search space monitor as described with reference to FIGS. 6 and 7.

At block 1820, the method 1800 may include communicating with a base station based at least in part on control information identified as a result of the monitoring of the first search space or the monitoring of the second search space, as described for example with reference to FIGS. 2-5. The operations of 1820 may be performed according to the methods described herein. In certain examples, aspects of the operations of 1820 may be performed by a search space monitor as described with reference to FIGS. 6 and 7.

Figure 19:
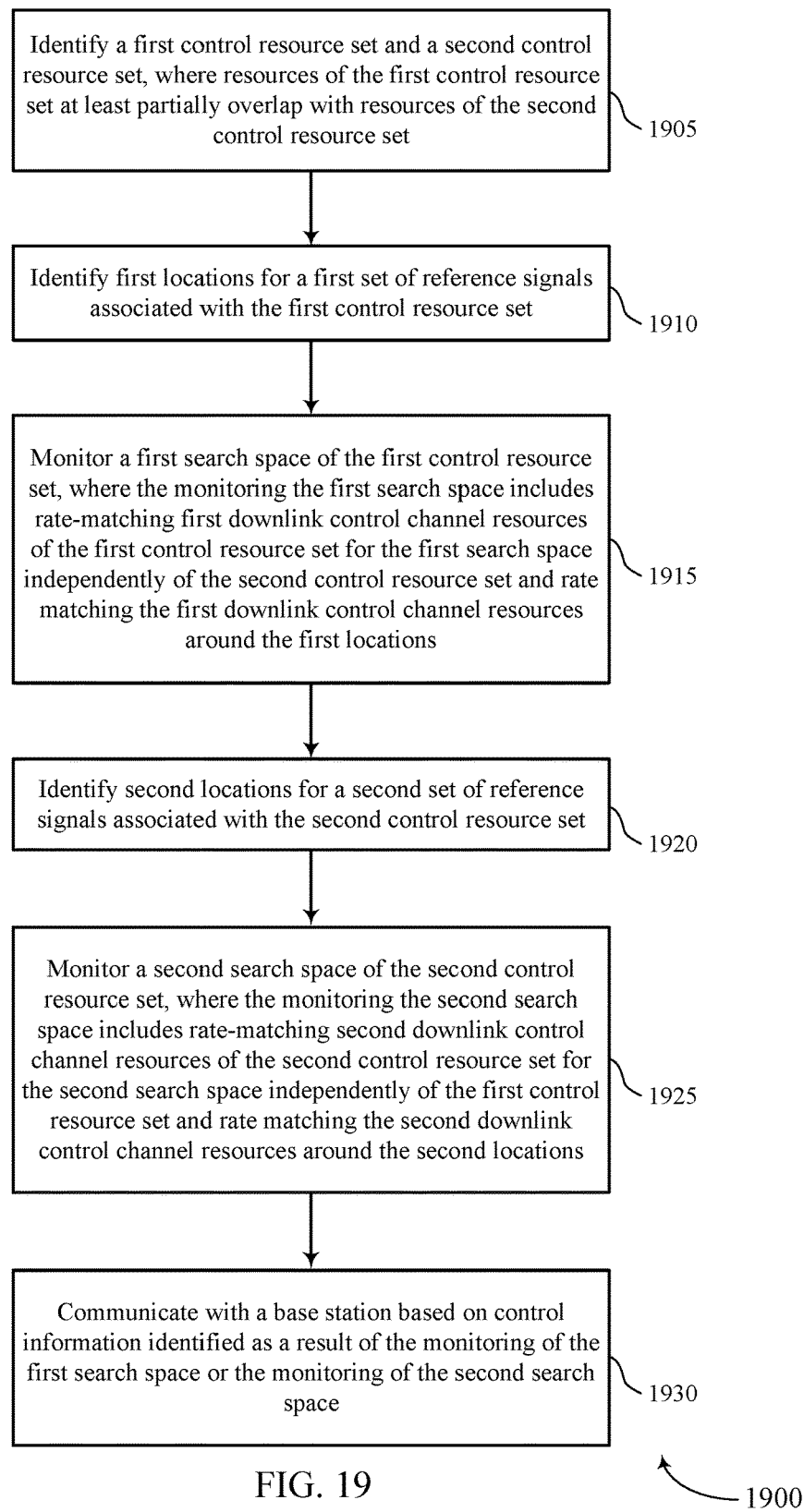

FIG. 19 shows a flowchart illustrating a method 1900 for techniques for handling overlapping sets of downlink control channel resources in accordance with aspects of the present disclosure. The operations of method 1900 may be implemented by a UE 115 or its components as described herein. For clarity, the method 1900 is described below with reference to aspects of one or more of the UEs described with reference to FIGS. 1 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 1905, the method 1900 may include identifying a first control resource set and a second control resource set, wherein resources of the first control resource set at least partially overlap with resources of the second control resource set, as described for example with reference to FIGS. 2-5. The operations of 1905 may be performed according to the methods described herein. In certain examples, aspects of the operations of 1905 may be performed by a search space monitor as described with reference to FIGS. 6 and 7.

At block 1910, the method 1900 may include identifying first locations for a first set of reference signals associated with the first control resource set, as described for example with reference to FIGS. 2-5. The operations of 1910 may be performed according to the methods described herein. In certain examples, aspects of the operations of 1910 may be performed by a reference signal identifier as described with reference to FIGS. 6 and 7.

At block 1915, the method 1900 may include monitoring a first search space of the first control resource set, wherein the monitoring the first search space comprises rate-matching first downlink control channel resources of the first control resource set for the first search space independently of the second control resource set and rate matching the first downlink control channel resources around the first locations, as described for example with reference to FIGS. 2-5. The operations of 1915 may be performed according to the methods described herein. In certain examples, aspects of the operations of 1915 may be performed by a search space monitor as described with reference to FIGS. 6 through 7.

At block 1920, the method 1900 may include identifying second locations for a second set of reference signals associated with the second control resource set, as described for example with reference to FIGS. 2-5. The operations of 1920 may be performed according to the methods described herein. In certain examples, aspects of the operations of 1920 may be performed by a reference signal identifier as described with reference to FIGS. 6 and 7.

At block 1925, the method 1900 may include monitoring a second search space of the second control resource set, wherein the monitoring the second search space comprises rate-matching second downlink control channel resources of the second control resource set for the second search space independently of the first control resource set and rate matching the second downlink control channel resources around the second locations, as described for example with reference to FIGS. 2-5. The operations of 1925 may be performed according to the methods described herein. In certain examples, aspects of the operations of 1925 may be performed by a search space monitor as described with reference to FIGS. 6 and 7.

At block 1930, the method 1900 may include communicating with a base station based at least in part on control information identified as a result of the monitoring of the first search space or the monitoring of the second search space, as described for example with reference to FIGS. 2-5. The operations of 1930 may be performed according to the methods described herein. In certain examples, aspects of the operations of 1930 may be performed by a search space monitor as described with reference to FIGS. 6 and 7.

Figure 20:
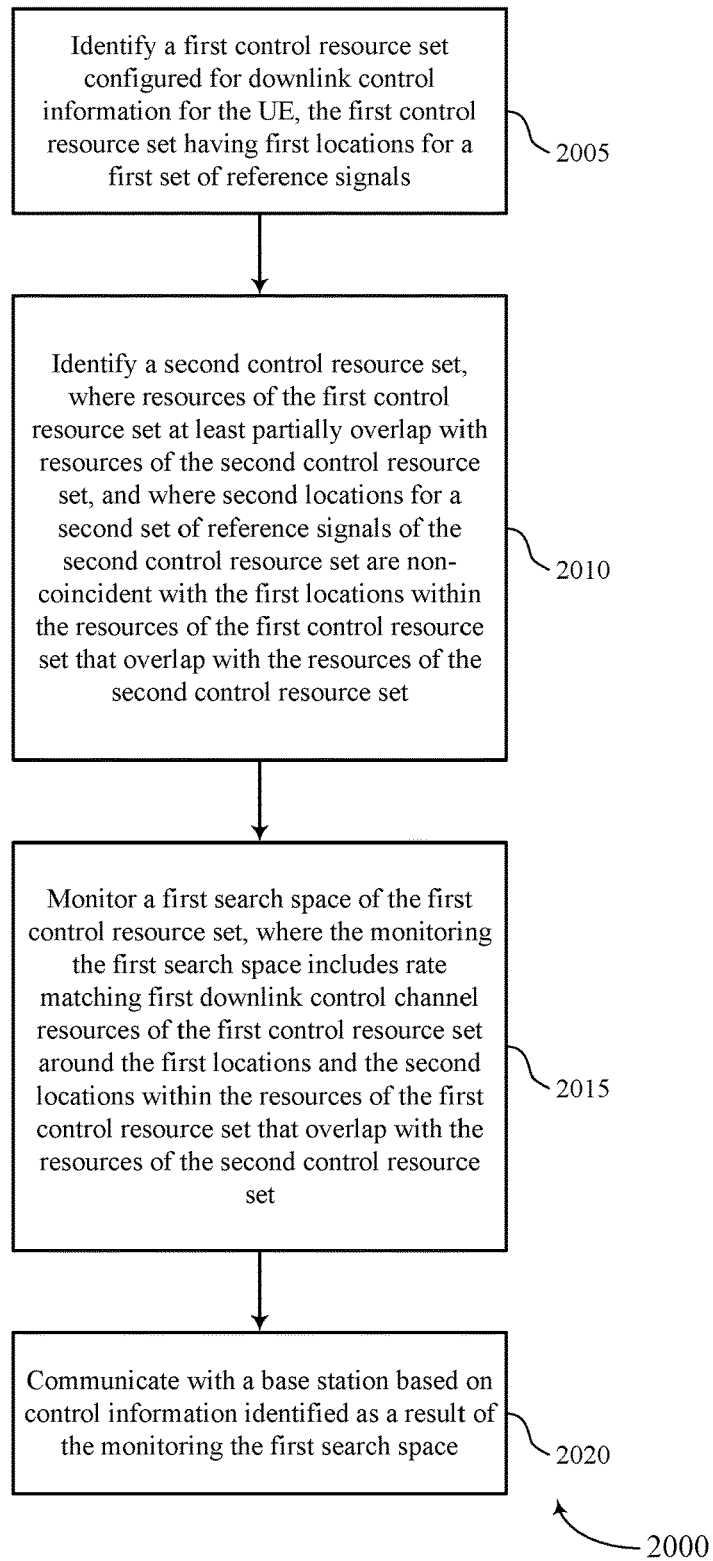

FIG. 20 shows a flowchart illustrating a method 2000 for techniques for handling overlapping sets of downlink control channel resources in accordance with aspects of the present disclosure. The operations of method 2000 may be implemented by a UE 115 or its components as described herein. For clarity, the method 2000 is described below with reference to aspects of one or more of the UEs described with reference to FIGS. 1 and 10, aspects of the apparatus described with reference to FIG. 6, or aspects of one or more of the wireless communication managers described with reference to FIGS. 6, 7, and 10. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include identifying a first control resource set configured for downlink control information for the UE, the first control resource set having first locations for a first set of reference signals, as described for example with reference to FIGS. 2-5. The operations of 2005 may be performed according to the methods described herein. In certain examples, aspects of the operations of 2005 may be performed by a search space monitor as described with reference to FIGS. 6 and 7.

At block 2010, the method 2000 may include identifying a second control resource set, wherein resources of the first control resource set at least partially overlap with resources of the second control resource set, and wherein second locations for a second set of reference signals of the second control resource set are non-coincident with the first locations within the resources of the first control resource set that overlap with the resources of the second control resource set, as described for example with reference to FIGS. 2-5. The operations of 2010 may be performed according to the methods described herein. In certain examples, aspects of the operations of 2010 may be performed by a search space monitor as described with reference to FIGS. 6 and 7.

At block 2015, the method 2000 may include monitoring a first search space of the first control resource set, wherein the monitoring the first search space comprises rate matching first downlink control channel resources of the first control resource set around the first locations and the second locations within the resources of the first control resource set that overlap with the resources of the second control resource set, as described for example with reference to FIGS. 2-5. The operations of 2015 may be performed according to the methods described herein. In certain examples, aspects of the operations of 2015 may be performed by a search space monitor as described with reference to FIGS. 6 and 7.

At block 2020, the method 2000 may include communicating with a base station based at least in part on control information identified as a result of the monitoring the first search space, as described for example with reference to FIGS. 2-5. The operations of 2020 may be performed according to the methods described herein. In certain examples, aspects of the operations of 2020 may be performed by a search space monitor as described with reference to FIGS. 6 and 7.

The methods 1200, 1300, 1400, 1500, 1600, 1700, 1800, 1900, and 200 described with reference to FIGS. 12-20 are example implementations of some of the techniques described in the present disclosure, and the operations of the methods may be rearranged, combined with other operations of the same or different method, or otherwise modified, such that other implementations are possible. In some examples, operations of the methods 1200, 1300, 1400, 1800, 1900, or 2000 may be combined. In some examples, operations of the methods 1500, 1600, or 1700 may be combined. In some examples, operations may be added to the methods.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
    identifying a first control resource set and a second control resource set, wherein resources of the first control resource set at least partially overlap with resources of the second control resource set;
    identifying first locations for a first set of reference signals associated with the first control resource set;
    monitoring a first search space of the first control resource set, wherein the monitoring the first search space comprises rate-matching first downlink control channel resources of the first control resource set for the first search space independently of the second control resource set and rate matching the first downlink control channel resources around the first locations;
    monitoring a second search space of the second control resource set, wherein the monitoring the second search space comprises rate-matching second downlink control channel resources of the second control resource set for the second search space independently of the first control resource set; and
    communicating with a base station based at least in part on control information identified as a result of the monitoring of the first search space or the monitoring of the second search space.

2. The method of claim 1, further comprising:
    identifying second locations for a second set of reference signals associated with the second control resource set, wherein the monitoring the second search space comprises rate matching the second downlink control channel resources around the second locations.

3. The method of claim 2, wherein the first locations coincide with the second locations within the resources of the first control resource set that overlap with the resources of the second control resource set.

4. The method of claim 2, wherein the first locations are non-coincident with the second locations within the resources of the first control resource set that overlap with the resources of the second control resource set.

5. The method of claim 4, wherein the monitoring the first search space comprises:
    rate matching the first downlink control channel resources to the second locations within the resources of the first control resource set that overlap with the resources of the second control resource set.

6. The method of claim 5, wherein the rate matching the first downlink control channel resources to the second locations is based at least in part on a type of the first control resource set and a type of the second control resource set.

7. The method of claim 1, wherein the monitoring the first search space comprises:
demodulating one or more downlink control channel candidates of the first search space within the resources of the first control resource set that overlap with the resources of the second control resource set based at least in part on the first set of reference signals.

8. The method of claim 1, further comprising:
determining that at least one reference signal associated with the first control resource set is in a portion of resources that overlap with the second control resource set based at least in part on a type of the first control resource set and a type of the second control resource set.

9. A method for wireless communication at a user equipment (UE), comprising:
identifying a first control resource set configured for downlink control information for the UE, the first control resource set having first locations for a first set of reference signals;
identifying a second control resource set, wherein resources of the first control resource set at least partially overlap with resources of the second control resource set, and wherein second locations for a second set of reference signals of the second control resource set are non-coincident with the first locations within the resources of the first control resource set that overlap with the resources of the second control resource set;
monitoring a first search space of the first control resource set, wherein the monitoring the first search space comprises rate matching first downlink control channel resources of the first control resource set around the first locations and the second locations within the resources of the first control resource set that overlap with the resources of the second control resource set;
demodulating one or more downlink control channel candidates of the first search space within the resources of the first control resource set that overlap with the resources of the second control resource set based at least in part on the first set of reference signals; and
communicating with a base station based at least in part on control information identified as a result of the monitoring the first search space and the demodulating.

10. The method of claim 9, further comprising:
determining that at least one reference signal associated with the first control resource set is in a portion of resources that overlap with the second control resource set based at least in part on a type of the first control resource set and a type of the second control resource set.

11. The method of claim 10, wherein the monitoring the first search space comprises:
spatially processing the resources of the first control resource set that overlap with the resources of the second control resource set based at least in part on the first set of reference signals.

12. The method of claim 9, further comprising:
identifying at least one physical channel transmitted on at least a portion of the first control resource set, wherein a downlink control channel is rate matched around the at least one physical channel.

13. An apparatus for wireless communication, comprising:
a processor;
memory in communication with the processor; and
instructions stored in the memory and executable by the processor to cause the apparatus to:
identify a first control resource set and a second control resource set, wherein resources of the first control resource set at least partially overlap with resources of the second control resource set;
identify first locations for a first set of reference signals associated with the first control resource set;
monitor a first search space of the first control resource set, wherein the monitoring the first search space comprises rate-matching first downlink control channel resources of the first control resource set for the first search space independently of the second control resource set and rate matching the first downlink control channel resources around the first locations;
monitor a second search space of the second control resource set, wherein the monitoring the second search space comprises rate-matching second downlink control channel resources of the second control resource set for the second search space independently of the first control resource set; and
communicate with a base station based at least in part on control information identified as a result of the monitoring of the first search space or the monitoring of the second search space.

14. The apparatus of claim 13, wherein the instructions are further executable by the processor to cause the apparatus to:
identify second locations for a second set of reference signals associated with the second control resource set, wherein the monitoring the second search space comprises rate matching the second downlink control channel resources around the second locations.

15. The apparatus of claim 14, wherein the first locations coincide with the second locations within the resources of the first control resource set that overlap with the resources of the second control resource set.

16. The apparatus of claim 14, wherein the first locations are non-coincident with the second locations within the resources of the first control resource set that overlap with the resources of the second control resource set.

17. The apparatus of claim 16, wherein the instructions to monitor the first search space are executable by the processor to cause the apparatus to:
rate match the first downlink control channel resources to the second locations within the resources of the first control resource set that overlap with the resources of the second control resource set.

18. The apparatus of claim 17, wherein the first downlink control channel resources are rate matched to the second locations based at least in part on a type of the first control resource set and a type of the second control resource set.

19. The apparatus of claim 13, wherein the instructions to monitor the first search space are executable by the processor to cause the apparatus to:
demodulate one or more downlink control channel candidates of the first search space within the resources of the first control resource set that overlap with the resources of the second control resource set based at least in part on the first set of reference signals.

20. The apparatus of claim 13, wherein the instructions are further executable by the processor to cause the apparatus to:
determine that at least one reference signal associated with the first control resource set is in a portion of resources that overlap with the second control resource set based at least in part on a type of the first control resource set and a type of the second control resource set.

21. An apparatus for wireless communication, comprising:
- a processor;
- memory in communication with the processor; and
- instructions stored in the memory and executable by the processor to cause the apparatus to:
- identify a first control resource set configured for downlink control information for the UE, the first control resource set having first locations for a first set of reference signals;
- identify a second control resource set, wherein resources of the first control resource set at least partially overlap with resources of the second control resource set, and wherein second locations for a second set of reference signals of the second control resource set are non-coincident with the first locations within the resources of the first control resource set that overlap with the resources of the second control resource set;
- monitor a first search space of the first control resource set, wherein the monitoring the first search space comprises rate matching first downlink control channel resources of the first control resource set around the first locations and the second locations within the resources of the first control resource set that overlap with the resources of the second control resource set;
- demodulate one or more downlink control channel candidates of the first search space within the resources of the first control resource set that overlap with the resources of the second control resource set based at least in part on the first set of reference signals; and
- communicate with a base station based at least in part on control information identified as a result of the monitoring the first search space and the demodulating.

22. The apparatus of claim 21, wherein the instructions are further executable by the processor to cause the apparatus to:
- determine that at least one reference signal associated with the first control resource set is in a portion of resources that overlap with the second control resource set based at least in part on a type of the first control resource set and a type of the second control resource set.

23. The apparatus of claim 22, wherein the instructions to monitor the first search space are executable by the processor to cause the apparatus to:
- spatially process the resources of the first control resource set that overlap with the resources of the second control resource set based at least in part on the first set of reference signals.

24. The apparatus of claim 21, wherein the instructions are further executable by the processor to cause the apparatus to:
- identify at least one physical channel transmitted on at least a portion of the first control resource set, wherein a downlink control channel is rate matched around the at least one physical channel.

* * * * *